United States Patent
Ribbich et al.

(10) Patent No.: US 10,808,958 B2
(45) Date of Patent: *Oct. 20, 2020

(54) USER CONTROL DEVICE WITH CANTILEVERED DISPLAY

(71) Applicant: Johnson Controls Technology Company, Auburn Hills, MI (US)

(72) Inventors: Joseph R. Ribbich, Waukesha, WI (US); Vinosh C. Diptee, Boynton Beach, FL (US); Julio A. Abdala, SW Ranches, FL (US); Claudio Santiago Ribeiro, Evanston, IL (US); Charles J. Gaidish, South Milwaukee, WI (US); Michael F. Kornacki, Oak Creek, WI (US); John P. Cipolla, Inverness, IL (US); Sudhi Sinha, Milwaukee, WI (US); Michael L. Ribbich, Oconomowoc, WI (US)

(73) Assignee: Johnson Controls Technology Company, Auburn Hills, MI (US)

(*) Notice: Subject to any disclaimer, the term of this patent is extended or adjusted under 35 U.S.C. 154(b) by 78 days.

This patent is subject to a terminal disclaimer.

(21) Appl. No.: 15/961,488

(22) Filed: Apr. 24, 2018

(65) Prior Publication Data

US 2018/0245811 A1 Aug. 30, 2018

Related U.S. Application Data

(63) Continuation of application No. 15/146,649, filed on May 4, 2016, now Pat. No. 9,964,328.

(Continued)

(51) Int. Cl.
*F24F 11/30* (2018.01)
*G05D 23/19* (2006.01)
(Continued)

(52) U.S. Cl.
CPC .............. *F24F 11/30* (2018.01); *F24F 11/50* (2018.01); *F24F 11/62* (2018.01); *F24F 11/70* (2018.01);
(Continued)

(58) Field of Classification Search
CPC ...... G05D 23/1902; F24F 11/30; F24F 11/50; F24F 11/52; F24F 11/62; F24F 11/63; F24F 11/70
(Continued)

(56) References Cited

U.S. PATENT DOCUMENTS

| 4,107,464 A | 8/1978 | Lynch et al. |
| 4,873,649 A | 10/1989 | Grald et al. |

(Continued)

FOREIGN PATENT DOCUMENTS

| CA | 2466854 | 4/2008 |
| CA | 2633200 | 1/2011 |

(Continued)

OTHER PUBLICATIONS

Examination Report for Australian Application No. 2016257458, dated May 7, 2018, 4 pages.

(Continued)

*Primary Examiner* — Marc E Norman
(74) *Attorney, Agent, or Firm* — Foley & Lardner LLP

(57) ABSTRACT

A thermostat includes a housing, a touch-sensitive display configured to display visual media and receive user inputs, and processing electronics configured to operate the touch-sensitive display. The housing includes a base and a display mount. The base includes a top wall, a bottom wall, a front wall connecting the top wall to the bottom wall, a first side wall connecting the top wall to the bottom wall, and a second side wall connecting the top wall to the bottom wall. The top wall, the bottom wall, the first side wall, and the second side (Continued)

wall define an internal volume. The display mount is cantilevered away from the top wall and includes a mounting surface. The display is attached to the mounting surface. The processing electronics are positioned within the interior volume.

26 Claims, 25 Drawing Sheets

Related U.S. Application Data

(60) Provisional application No. 62/156,868, filed on May 4, 2015, provisional application No. 62/247,672, filed on Oct. 28, 2015, provisional application No. 62/260,141, filed on Nov. 25, 2015, provisional application No. 62/274,750, filed on Jan. 4, 2016, provisional application No. 62/275,199, filed on Jan. 5, 2016, provisional application No. 62/275,202, filed on Jan. 5, 2016, provisional application No. 62/275,204, filed on Jan. 5, 2016, provisional application No. 62/275,711, filed on Jan. 6, 2016.

(51) Int. Cl.
  *H05B 47/11*    (2020.01)
  *H05B 47/12*    (2020.01)
  *H05B 47/105*   (2020.01)
  *G06F 3/041*    (2006.01)
  *G05B 15/02*    (2006.01)
  *F24F 11/62*    (2018.01)
  *F24F 11/50*    (2018.01)
  *F24F 11/70*    (2018.01)
  *F24F 11/52*    (2018.01)
  *F24F 110/10*   (2018.01)
  *F24F 140/00*   (2018.01)
  *F24F 11/63*    (2018.01)

(52) U.S. Cl.
  CPC ......... *G05B 15/02* (2013.01); *G05D 23/1902* (2013.01); *G06F 3/041* (2013.01); *G06F 3/0412* (2013.01); *H05B 47/105* (2020.01); *H05B 47/11* (2020.01); *H05B 47/12* (2020.01); *F24F 11/52* (2018.01); *F24F 11/63* (2018.01); *F24F 2110/10* (2018.01); *F24F 2140/00* (2018.01)

(58) Field of Classification Search
  USPC .......................................................... 236/94
  See application file for complete search history.

(56) References Cited

U.S. PATENT DOCUMENTS

| | | |
|---|---|---|
| 4,942,613 A | 7/1990 | Lynch |
| 5,052,186 A | 10/1991 | Dudley et al. |
| 5,062,276 A | 11/1991 | Dudley |
| 5,797,729 A | 8/1998 | Rafuse et al. |
| 6,121,885 A | 9/2000 | Masone et al. |
| 6,164,374 A | 12/2000 | Rhodes et al. |
| 6,169,937 B1 | 1/2001 | Peterson |
| 6,227,961 B1 | 5/2001 | Moore et al. |
| 6,260,765 B1 | 7/2001 | Natale et al. |
| 6,314,750 B1 | 11/2001 | Ishikawa et al. |
| 6,351,693 B1 | 2/2002 | Monie et al. |
| 6,435,418 B1 | 8/2002 | Toth et al. |
| 6,478,233 B1 | 11/2002 | Shah |
| 6,487,869 B1 | 12/2002 | Sulc et al. |
| 6,557,771 B2 | 5/2003 | Shah |
| 6,641,054 B2 | 11/2003 | Morey |
| 6,726,112 B1 | 4/2004 | Ho |
| 6,726,113 B2 | 4/2004 | Guo |
| 6,810,307 B1 | 10/2004 | Addy |
| 6,824,069 B2 | 11/2004 | Rosen |
| 6,851,621 B1 | 2/2005 | Wacker et al. |
| 6,874,691 B1 | 4/2005 | Hildebrand et al. |
| 6,888,441 B2 | 5/2005 | Carey |
| 6,912,429 B1 | 6/2005 | Bilger |
| 6,995,518 B2 | 2/2006 | Havlik et al. |
| 7,028,912 B1 | 4/2006 | Rosen |
| 7,083,109 B2 | 8/2006 | Pouchak |
| 7,099,748 B2 | 8/2006 | Rayburn |
| 7,140,551 B2 | 11/2006 | De Pauw et al. |
| 7,146,253 B2 | 12/2006 | Hoog et al. |
| 7,152,806 B1 | 12/2006 | Rosen |
| 7,156,317 B1 | 1/2007 | Moore |
| 7,156,318 B1 | 1/2007 | Rosen |
| 7,159,789 B2 | 1/2007 | Schwendinger et al. |
| 7,159,790 B2 | 1/2007 | Schwendinger et al. |
| 7,167,079 B2 | 1/2007 | Smyth et al. |
| 7,188,002 B2 | 3/2007 | Chapman et al. |
| 7,212,887 B2 | 5/2007 | Shah et al. |
| 7,225,054 B2 | 5/2007 | Amundson et al. |
| 7,232,075 B1 | 6/2007 | Rosen |
| 7,261,243 B2 | 8/2007 | Butler et al. |
| 7,274,972 B2 | 9/2007 | Amundson et al. |
| 7,287,709 B2 | 10/2007 | Proffitt et al. |
| 7,296,426 B2 | 11/2007 | Butler et al. |
| 7,299,996 B2 | 11/2007 | Garrett et al. |
| 7,306,165 B2 | 12/2007 | Shah |
| 7,308,384 B2 | 12/2007 | Shah et al. |
| 7,317,970 B2 | 1/2008 | Pienta et al. |
| 7,331,187 B2 | 2/2008 | Kates |
| 7,343,751 B2 | 3/2008 | Kates |
| 7,383,158 B2 | 6/2008 | Krocker et al. |
| RE40,437 E | 7/2008 | Rosen |
| 7,402,780 B2 | 7/2008 | Mueller et al. |
| 7,434,744 B2 | 10/2008 | Garozzo et al. |
| 7,442,012 B2 | 10/2008 | Moens |
| 7,469,550 B2 | 12/2008 | Chapman et al. |
| 7,475,558 B2 | 1/2009 | Perry |
| 7,475,828 B2 | 1/2009 | Bartlett et al. |
| 7,556,207 B2 | 7/2009 | Mueller et al. |
| 7,565,813 B2 | 7/2009 | Pouchak |
| 7,575,179 B2 | 8/2009 | Morrow et al. |
| 7,584,897 B2 | 9/2009 | Schultz et al. |
| 7,592,713 B2 | 9/2009 | Bryan et al. |
| 7,614,567 B2 | 11/2009 | Chapman et al. |
| 7,624,931 B2 | 12/2009 | Chapman et al. |
| 7,633,743 B2 | 12/2009 | Barton et al. |
| 7,636,604 B2 | 12/2009 | Bergman et al. |
| 7,638,739 B2 | 12/2009 | Rhodes et al. |
| 7,641,126 B2 | 1/2010 | Schultz et al. |
| 7,645,158 B2 | 1/2010 | Mulhouse et al. |
| 7,667,163 B2 | 2/2010 | Ashworth et al. |
| 7,726,581 B2 | 6/2010 | Naujok et al. |
| 7,731,096 B2 | 6/2010 | Lorenz et al. |
| 7,731,098 B2 | 6/2010 | Butler et al. |
| 7,740,184 B2 | 6/2010 | Schnell et al. |
| 7,748,225 B2 | 7/2010 | Butler et al. |
| 7,748,639 B2 | 7/2010 | Perry |
| 7,748,640 B2 | 7/2010 | Roher et al. |
| 7,755,220 B2 | 7/2010 | Sorg et al. |
| 7,765,826 B2 | 8/2010 | Nichols |
| 7,774,102 B2 | 8/2010 | Butler et al. |
| 7,775,452 B2 | 8/2010 | Shah et al. |
| 7,784,291 B2 | 8/2010 | Butler et al. |
| 7,784,704 B2 | 8/2010 | Harter |
| 7,802,618 B2 | 9/2010 | Simon et al. |
| 7,832,221 B2 | 11/2010 | Wijaya et al. |
| 7,832,652 B2 | 11/2010 | Barton et al. |
| 7,845,576 B2 | 12/2010 | Siddaramanna et al. |
| 7,861,941 B2 | 1/2011 | Schultz et al. |
| 7,867,646 B2 | 1/2011 | Rhodes |
| 7,904,209 B2 | 3/2011 | Podgorny et al. |
| 7,904,830 B2 | 3/2011 | Hoglund et al. |
| 7,908,116 B2 | 3/2011 | Steinberg et al. |
| 7,908,117 B2 | 3/2011 | Steinberg et al. |
| 7,918,406 B2 | 4/2011 | Rosen |
| 7,938,336 B2 | 5/2011 | Rhodes et al. |

(56) References Cited

U.S. PATENT DOCUMENTS

| | | |
|---|---|---|
| 7,941,294 B2 | 5/2011 | Shahi et al. |
| 7,954,726 B2 | 6/2011 | Siddaramanna et al. |
| 7,963,454 B2 | 6/2011 | Sullivan et al. |
| 7,979,164 B2 | 7/2011 | Garozzo et al. |
| 7,992,794 B2 | 8/2011 | Leen et al. |
| 8,010,237 B2 | 8/2011 | Cheung et al. |
| 8,032,254 B2 | 10/2011 | Amundson et al. |
| 8,078,326 B2 | 12/2011 | Harrod et al. |
| 8,082,065 B2 | 12/2011 | Imes et al. |
| 8,083,154 B2 | 12/2011 | Schultz et al. |
| 8,089,032 B2 | 1/2012 | Beland et al. |
| 8,091,794 B2 | 1/2012 | Siddaramanna et al. |
| 8,099,195 B2 | 1/2012 | Imes et al. |
| 8,108,076 B2 | 1/2012 | Imes et al. |
| 8,131,506 B2 | 3/2012 | Steinberg et al. |
| 8,141,791 B2 | 3/2012 | Rosen |
| 8,167,216 B2 | 5/2012 | Schultz et al. |
| 8,180,492 B2 | 5/2012 | Steinberg |
| 8,190,296 B2 | 5/2012 | Alhilo |
| 8,195,313 B1 | 6/2012 | Fadell et al. |
| 8,196,185 B2 | 6/2012 | Geadelmann et al. |
| 8,209,059 B2 | 6/2012 | Stockton |
| 8,239,066 B2 | 8/2012 | Jennings et al. |
| 8,276,829 B2 | 10/2012 | Stoner et al. |
| 8,280,536 B1 | 10/2012 | Fadell et al. |
| 8,280,556 B2 | 10/2012 | Besore et al. |
| 8,289,182 B2 | 10/2012 | Vogel et al. |
| 8,289,226 B2 | 10/2012 | Takach et al. |
| 8,299,919 B2 | 10/2012 | Dayton et al. |
| 8,321,058 B2 | 11/2012 | Zhou et al. |
| 8,346,396 B2 | 1/2013 | Amundson et al. |
| 8,387,891 B1 | 3/2013 | Simon et al. |
| 8,393,550 B2 | 3/2013 | Simon et al. |
| 8,412,382 B2 | 4/2013 | Imes et al. |
| 8,412,488 B2 | 4/2013 | Steinberg et al. |
| 8,429,566 B2 | 4/2013 | Koushik et al. |
| 8,456,293 B1 | 6/2013 | Trundle et al. |
| 8,473,109 B1 | 6/2013 | Imes et al. |
| 8,476,964 B1 | 7/2013 | Atri |
| 8,489,243 B2 | 7/2013 | Fadell et al. |
| 8,498,749 B2 | 7/2013 | Imes et al. |
| 8,504,180 B2 | 8/2013 | Imes et al. |
| 8,510,255 B2 | 8/2013 | Fadell et al. |
| 8,511,576 B2 | 8/2013 | Warren et al. |
| 8,511,577 B2 | 8/2013 | Warren et al. |
| 8,517,088 B2 | 8/2013 | Moore et al. |
| 8,523,083 B2 | 9/2013 | Warren et al. |
| 8,523,084 B2 | 9/2013 | Siddaramanna et al. |
| 8,527,096 B2 | 9/2013 | Pavlak et al. |
| 8,532,827 B2 | 9/2013 | Stefanski et al. |
| 8,538,588 B2 | 9/2013 | Kasper |
| 8,544,285 B2 | 10/2013 | Stefanski et al. |
| 8,549,658 B2 | 10/2013 | Kolavennu et al. |
| 8,550,368 B2 | 10/2013 | Butler et al. |
| 8,554,374 B2 | 10/2013 | Lunacek et al. |
| 8,555,662 B2 | 10/2013 | Peterson et al. |
| 8,558,179 B2 | 10/2013 | Filson et al. |
| 8,560,127 B2 | 10/2013 | Leen et al. |
| 8,560,128 B2 | 10/2013 | Ruff et al. |
| 8,571,518 B2 | 10/2013 | Imes et al. |
| 8,594,850 B1 | 11/2013 | Gourlay et al. |
| 8,596,550 B2 | 12/2013 | Steinberg et al. |
| 8,600,564 B2 | 12/2013 | Imes et al. |
| 8,606,409 B2 | 12/2013 | Amundson et al. |
| 8,613,792 B2 | 12/2013 | Ragland et al. |
| 8,620,841 B1 | 12/2013 | Filson et al. |
| 8,622,314 B2 | 1/2014 | Fisher et al. |
| 8,626,344 B2 | 1/2014 | Imes et al. |
| 8,630,741 B1 | 1/2014 | Matsuoka et al. |
| 8,630,742 B1 | 1/2014 | Stefanski et al. |
| 8,644,009 B2 | 2/2014 | Rylski et al. |
| 8,659,302 B1 | 2/2014 | Warren et al. |
| 8,671,702 B1 | 3/2014 | Shotey et al. |
| 8,674,816 B2 | 3/2014 | Trundle et al. |
| 8,689,572 B2 | 4/2014 | Evans et al. |
| 8,695,887 B2 | 4/2014 | Helt et al. |
| 8,706,270 B2 | 4/2014 | Fadell et al. |
| 8,708,242 B2 | 4/2014 | Conner et al. |
| 8,712,590 B2 | 4/2014 | Steinberg |
| 8,718,826 B2 | 5/2014 | Ramachandran et al. |
| 8,726,680 B2 | 5/2014 | Schenk et al. |
| 8,727,611 B2 | 5/2014 | Huppi et al. |
| 8,738,327 B2 | 5/2014 | Steinberg et al. |
| 8,746,583 B2 | 6/2014 | Simon et al. |
| 8,752,771 B2 | 6/2014 | Warren et al. |
| 8,754,780 B2 | 6/2014 | Petite et al. |
| 8,766,194 B2 | 7/2014 | Filson et al. |
| 8,770,490 B2 | 7/2014 | Drew |
| 8,770,491 B2 | 7/2014 | Warren et al. |
| 8,788,100 B2 | 7/2014 | Grohman et al. |
| 8,788,103 B2 | 7/2014 | Warren et al. |
| 8,802,981 B2 * | 8/2014 | Wallaert .................. F24F 11/00 174/58 |
| 8,830,267 B2 | 9/2014 | Brackney |
| 8,838,282 B1 | 9/2014 | Ratliff et al. |
| 8,843,239 B2 | 9/2014 | Mighdoll et al. |
| 8,850,348 B2 | 9/2014 | Fadell et al. |
| 8,855,830 B2 | 10/2014 | Imes et al. |
| 8,868,219 B2 | 10/2014 | Fadell et al. |
| 8,870,086 B2 | 10/2014 | Tessier et al. |
| 8,870,087 B2 | 10/2014 | Pienta et al. |
| 8,880,047 B2 | 11/2014 | Konicek et al. |
| 8,893,032 B2 | 11/2014 | Bruck et al. |
| 8,903,552 B2 | 12/2014 | Amundson et al. |
| 8,918,219 B2 | 12/2014 | Sloo et al. |
| 8,942,853 B2 | 1/2015 | Stefanski et al. |
| 8,944,338 B2 | 2/2015 | Warren et al. |
| 8,950,686 B2 | 2/2015 | Matsuoka et al. |
| 8,950,687 B2 | 2/2015 | Bergman et al. |
| 8,961,005 B2 | 2/2015 | Huppi et al. |
| 8,978,994 B2 | 3/2015 | Moore et al. |
| 8,998,102 B2 | 4/2015 | Fadell et al. |
| 9,014,686 B2 | 4/2015 | Ramachandran et al. |
| 9,014,860 B2 | 4/2015 | Moore et al. |
| 9,020,647 B2 | 4/2015 | Johnson et al. |
| 9,026,232 B2 | 5/2015 | Fadell et al. |
| 9,033,255 B2 | 5/2015 | Tessier et al. |
| RE45,574 E | 6/2015 | Harter |
| 9,074,784 B2 | 7/2015 | Sullivan et al. |
| 9,075,419 B2 | 7/2015 | Sloo et al. |
| 9,077,055 B2 | 7/2015 | Yau |
| 9,080,782 B1 | 7/2015 | Sheikh |
| 9,081,393 B2 | 7/2015 | Lunacek et al. |
| 9,086,703 B2 | 7/2015 | Warren et al. |
| 9,088,306 B1 | 7/2015 | Ramachandran et al. |
| 9,092,039 B2 | 7/2015 | Fadell et al. |
| 9,098,279 B2 | 8/2015 | Mucignat et al. |
| 9,116,529 B2 | 8/2015 | Warren et al. |
| 9,121,623 B2 | 9/2015 | Filson et al. |
| 9,122,283 B2 | 9/2015 | Rylski et al. |
| 9,125,049 B2 | 9/2015 | Huang et al. |
| 9,127,853 B2 | 9/2015 | Filson et al. |
| 9,134,710 B2 | 9/2015 | Cheung et al. |
| 9,134,715 B2 | 9/2015 | Geadelmann et al. |
| 9,146,041 B2 | 9/2015 | Novotny et al. |
| 9,151,510 B2 | 10/2015 | Leen |
| 9,154,001 B2 | 10/2015 | Dharwada et al. |
| 9,157,764 B2 | 10/2015 | Shetty et al. |
| 9,164,524 B2 | 10/2015 | Imes et al. |
| 9,175,868 B2 | 11/2015 | Fadell et al. |
| 9,175,871 B2 | 11/2015 | Gourlay et al. |
| 9,182,141 B2 | 11/2015 | Sullivan et al. |
| 9,189,751 B2 | 11/2015 | Matsuoka et al. |
| 9,191,277 B2 | 11/2015 | Rezvani et al. |
| 9,191,909 B2 | 11/2015 | Rezvani et al. |
| 9,194,597 B2 | 11/2015 | Steinberg et al. |
| 9,194,598 B2 | 11/2015 | Fadell et al. |
| 9,194,600 B2 | 11/2015 | Kates |
| 9,207,817 B2 | 12/2015 | Tu |
| 9,213,342 B2 | 12/2015 | Drake et al. |
| 9,215,281 B2 | 12/2015 | Iggulden et al. |
| 9,222,693 B2 | 12/2015 | Gourlay et al. |
| 9,223,323 B2 | 12/2015 | Matas et al. |
| 9,234,669 B2 | 1/2016 | Filson et al. |

(56) References Cited

U.S. PATENT DOCUMENTS

| | | | |
|---|---|---|---|
| 9,244,445 B2 | 1/2016 | Finch et al. | |
| 9,244,470 B2 | 1/2016 | Steinberg | |
| 9,261,287 B2 | 2/2016 | Warren et al. | |
| 9,268,344 B2 | 2/2016 | Warren et al. | |
| 9,279,595 B2 | 3/2016 | Mighdoll et al. | |
| 9,282,590 B2 | 3/2016 | Donlan | |
| 9,285,134 B2 | 3/2016 | Bray et al. | |
| 9,285,802 B2 | 3/2016 | Arensmeier | |
| 9,286,781 B2 | 3/2016 | Filson et al. | |
| 9,291,359 B2 | 3/2016 | Fadell et al. | |
| 9,292,022 B2 | 3/2016 | Ramachandran et al. | |
| 9,298,196 B2 | 3/2016 | Matsuoka et al. | |
| 9,298,197 B2 | 3/2016 | Matsuoka et al. | |
| 9,319,234 B2 | 4/2016 | Davis et al. | |
| 9,353,965 B1 | 5/2016 | Goyal et al. | |
| D763,707 S | 8/2016 | Sinha et al. | |
| 9,589,459 B2 | 3/2017 | Davis et al. | |
| D790,369 S | 6/2017 | Sinha et al. | |
| 9,696,701 B2 | 7/2017 | Vasylyev | |
| 9,762,408 B2 | 9/2017 | Davis et al. | |
| 9,857,238 B2 | 1/2018 | Malhotra et al. | |
| D810,591 S | 2/2018 | Ribbich et al. | |
| 9,887,887 B2 | 2/2018 | Hunter et al. | |
| 9,890,971 B2 * | 2/2018 | Ribbich | F24F 11/30 |
| D814,321 S | 4/2018 | Abdala et al. | |
| 9,964,328 B2 * | 5/2018 | Ribbich | F24F 11/30 |
| 2001/0015281 A1 | 8/2001 | Schiedegger et al. | |
| 2002/0123843 A1 | 9/2002 | Hood | |
| 2003/0034897 A1 | 2/2003 | Shamoon et al. | |
| 2003/0034898 A1 | 2/2003 | Shamoon et al. | |
| 2003/0136853 A1 | 7/2003 | Morey | |
| 2003/0177012 A1 | 9/2003 | Drennan | |
| 2004/0074978 A1 | 4/2004 | Rosen | |
| 2004/0125940 A1 | 7/2004 | Turcan et al. | |
| 2004/0249479 A1 | 12/2004 | Shorrock | |
| 2004/0262410 A1 | 12/2004 | Hull | |
| 2005/0040943 A1 | 2/2005 | Winick | |
| 2005/0083168 A1 | 4/2005 | Breitenbach | |
| 2005/0119794 A1 | 6/2005 | Amundson et al. | |
| 2005/0156049 A1 | 7/2005 | Van Ostrand et al. | |
| 2005/0194456 A1 | 9/2005 | Tessier et al. | |
| 2005/0195757 A1 | 9/2005 | Kidder et al. | |
| 2005/0270151 A1 | 12/2005 | Winick | |
| 2005/0270735 A1 | 12/2005 | Chen | |
| 2006/0038025 A1 | 2/2006 | Lee | |
| 2006/0113398 A1 | 6/2006 | Ashworth | |
| 2006/0192022 A1 | 8/2006 | Barton et al. | |
| 2006/0226970 A1 | 10/2006 | Saga et al. | |
| 2006/0260334 A1 | 11/2006 | Carey et al. | |
| 2006/0265489 A1 | 11/2006 | Moore | |
| 2007/0013532 A1 | 1/2007 | Ehlers | |
| 2007/0045431 A1 | 3/2007 | Chapman et al. | |
| 2007/0050732 A1 | 3/2007 | Chapman et al. | |
| 2007/0057079 A1 | 3/2007 | Stark et al. | |
| 2007/0114295 A1 | 5/2007 | Jenkins | |
| 2007/0198099 A9 | 8/2007 | Shah | |
| 2007/0228182 A1 | 10/2007 | Wagner et al. | |
| 2007/0228183 A1 | 10/2007 | Kennedy et al. | |
| 2007/0241203 A1 | 10/2007 | Wagner et al. | |
| 2008/0015740 A1 | 1/2008 | Osann | |
| 2008/0048046 A1 | 2/2008 | Wagner et al. | |
| 2008/0054084 A1 | 3/2008 | Olson | |
| 2008/0099568 A1 | 5/2008 | Nicodem et al. | |
| 2008/0120446 A1 | 5/2008 | Butler et al. | |
| 2008/0151458 A1 | 6/2008 | Beland et al. | |
| 2008/0158178 A1 * | 7/2008 | Hotelling | G06F 3/044 345/173 |
| 2008/0161978 A1 | 7/2008 | Shah | |
| 2008/0216495 A1 | 9/2008 | Kates | |
| 2008/0221714 A1 | 9/2008 | Schoettle | |
| 2008/0223051 A1 | 9/2008 | Kates | |
| 2008/0227430 A1 | 9/2008 | Polk | |
| 2008/0280637 A1 | 11/2008 | Shaffer et al. | |
| 2008/0289347 A1 | 11/2008 | Kadle et al. | |
| 2008/0290183 A1 | 11/2008 | Laberge et al. | |
| 2008/0294274 A1 | 11/2008 | Laberge et al. | |
| 2008/0295030 A1 | 11/2008 | Laberge et al. | |
| 2009/0122329 A1 | 5/2009 | Hegemier et al. | |
| 2009/0140065 A1 | 6/2009 | Juntunen et al. | |
| 2009/0143880 A1 | 6/2009 | Amundson et al. | |
| 2009/0143918 A1 | 6/2009 | Amundson et al. | |
| 2009/0144015 A1 | 6/2009 | Bedard | |
| 2009/0251422 A1 | 10/2009 | Wu et al. | |
| 2009/0276096 A1 | 11/2009 | Proffitt et al. | |
| 2010/0070089 A1 | 3/2010 | Harrod et al. | |
| 2010/0070092 A1 | 3/2010 | Winter et al. | |
| 2010/0084482 A1 | 4/2010 | Kennedy et al. | |
| 2010/0101854 A1 | 4/2010 | Wallaert et al. | |
| 2010/0106334 A1 | 4/2010 | Grohman et al. | |
| 2010/0131884 A1 | 5/2010 | Shah | |
| 2010/0145536 A1 | 6/2010 | Masters et al. | |
| 2010/0163633 A1 | 7/2010 | Barrett et al. | |
| 2010/0163635 A1 | 7/2010 | Ye | |
| 2010/0171889 A1 | 7/2010 | Pantel et al. | |
| 2010/0182743 A1 | 7/2010 | Roher | |
| 2010/0190479 A1 | 7/2010 | Scott et al. | |
| 2010/0204834 A1 | 8/2010 | Comerford et al. | |
| 2010/0212879 A1 | 8/2010 | Schnell et al. | |
| 2010/0250707 A1 | 9/2010 | Dalley et al. | |
| 2011/0006887 A1 | 1/2011 | Shaull et al. | |
| 2011/0046798 A1 | 2/2011 | Imes et al. | |
| 2011/0067851 A1 | 3/2011 | Terlson et al. | |
| 2011/0087988 A1 | 4/2011 | Ray et al. | |
| 2011/0088416 A1 | 4/2011 | Koethler | |
| 2011/0128378 A1 | 6/2011 | Raji | |
| 2011/0132991 A1 | 6/2011 | Moody et al. | |
| 2011/0181412 A1 | 7/2011 | Alexander et al. | |
| 2011/0209097 A1 | 8/2011 | Hinckley et al. | |
| 2011/0264279 A1 | 10/2011 | Poth | |
| 2012/0001873 A1 | 1/2012 | Wu et al. | |
| 2012/0007555 A1 | 1/2012 | Bukow | |
| 2012/0046859 A1 | 2/2012 | Imes et al. | |
| 2012/0048955 A1 | 3/2012 | Lin et al. | |
| 2012/0061480 A1 | 3/2012 | Deligiannis et al. | |
| 2012/0093141 A1 | 4/2012 | Imes et al. | |
| 2012/0095601 A1 | 4/2012 | Abraham et al. | |
| 2012/0101637 A1 | 4/2012 | Imes et al. | |
| 2012/0123594 A1 | 5/2012 | Finch et al. | |
| 2012/0126020 A1 | 5/2012 | Filson et al. | |
| 2012/0126021 A1 | 5/2012 | Warren et al. | |
| 2012/0131504 A1 | 5/2012 | Fadell et al. | |
| 2012/0165993 A1 | 6/2012 | Whitehouse | |
| 2012/0179727 A1 | 7/2012 | Esser | |
| 2012/0181010 A1 | 7/2012 | Schultz et al. | |
| 2012/0191257 A1 | 7/2012 | Corcoran et al. | |
| 2012/0193437 A1 | 8/2012 | Henry et al. | |
| 2012/0229521 A1 | 9/2012 | Hales et al. | |
| 2012/0230661 A1 | 9/2012 | Alhilo | |
| 2012/0239207 A1 | 9/2012 | Fadell et al. | |
| 2012/0252430 A1 | 10/2012 | Imes et al. | |
| 2012/0259469 A1 | 10/2012 | Ward et al. | |
| 2012/0259470 A1 | 10/2012 | Nijhawan et al. | |
| 2012/0298763 A1 | 11/2012 | Young | |
| 2012/0303165 A1 | 11/2012 | Qu et al. | |
| 2012/0303828 A1 | 11/2012 | Young et al. | |
| 2012/0310418 A1 | 12/2012 | Harrod et al. | |
| 2012/0315848 A1 | 12/2012 | Smith et al. | |
| 2013/0002447 A1 | 1/2013 | Vogel et al. | |
| 2013/0054758 A1 | 2/2013 | Imes et al. | |
| 2013/0057381 A1 | 3/2013 | Kandhasamy | |
| 2013/0087628 A1 | 4/2013 | Nelson et al. | |
| 2013/0090767 A1 | 4/2013 | Bruck et al. | |
| 2013/0099008 A1 | 4/2013 | Aljabari et al. | |
| 2013/0099009 A1 | 4/2013 | Filson et al. | |
| 2013/0123991 A1 | 5/2013 | Richmond | |
| 2013/0138250 A1 | 5/2013 | Mowery et al. | |
| 2013/0144443 A1 | 6/2013 | Casson et al. | |
| 2013/0151016 A1 | 6/2013 | Bias et al. | |
| 2013/0151018 A1 | 6/2013 | Bias et al. | |
| 2013/0158721 A1 | 6/2013 | Somasundaram et al. | |
| 2013/0163300 A1 | 6/2013 | Zhao et al. | |
| 2013/0180700 A1 | 7/2013 | Aycock | |
| 2013/0190932 A1 | 7/2013 | Schuman | |
| 2013/0190940 A1 | 7/2013 | Sloop et al. | |

(56) References Cited

U.S. PATENT DOCUMENTS

| | | |
|---|---|---|
| 2013/0204408 A1 | 8/2013 | Thiruvengada et al. |
| 2013/0204441 A1 | 8/2013 | Sloo et al. |
| 2013/0204442 A1 | 8/2013 | Modi et al. |
| 2013/0211600 A1 | 8/2013 | Dean-Hendricks et al. |
| 2013/0215058 A1 | 8/2013 | Brazell et al. |
| 2013/0221117 A1 | 8/2013 | Warren et al. |
| 2013/0228633 A1 | 9/2013 | Toth et al. |
| 2013/0234840 A1 | 9/2013 | Trundle et al. |
| 2013/0238142 A1 | 9/2013 | Nichols et al. |
| 2013/0245838 A1 | 9/2013 | Zywicki et al. |
| 2013/0261803 A1 | 10/2013 | Kolavennu |
| 2013/0261807 A1 | 10/2013 | Zywicki et al. |
| 2013/0268125 A1 | 10/2013 | Matsuoka |
| 2013/0268129 A1 | 10/2013 | Fadell et al. |
| 2013/0271670 A1 | 10/2013 | Sakata et al. |
| 2013/0292481 A1 | 11/2013 | Filson et al. |
| 2013/0297078 A1 | 11/2013 | Kolavennu |
| 2013/0310418 A1 | 11/2013 | Brenchley et al. |
| 2013/0318217 A1 | 11/2013 | Imes et al. |
| 2013/0318444 A1 | 11/2013 | Imes et al. |
| 2013/0325190 A1 | 12/2013 | Imes et al. |
| 2013/0332000 A1 | 12/2013 | Imes et al. |
| 2013/0338837 A1 | 12/2013 | Hublou et al. |
| 2013/0338839 A1 | 12/2013 | Rogers et al. |
| 2013/0340993 A1 | 12/2013 | Siddaramanna et al. |
| 2013/0345882 A1 | 12/2013 | Dushane et al. |
| 2014/0000861 A1 | 1/2014 | Barrett et al. |
| 2014/0002461 A1 | 1/2014 | Wang |
| 2014/0031989 A1 | 1/2014 | Bergman et al. |
| 2014/0034284 A1 | 2/2014 | Butler et al. |
| 2014/0039692 A1 | 2/2014 | Leen et al. |
| 2014/0041846 A1 | 2/2014 | Leen et al. |
| 2014/0048608 A1 | 2/2014 | Frank |
| 2014/0052300 A1 | 2/2014 | Matsuoka et al. |
| 2014/0058806 A1 | 2/2014 | Guenette et al. |
| 2014/0070919 A1 | 3/2014 | Jackson et al. |
| 2014/0081466 A1 | 3/2014 | Huapeng et al. |
| 2014/0112331 A1 | 4/2014 | Rosen |
| 2014/0114706 A1 | 4/2014 | Blakely |
| 2014/0117103 A1 | 5/2014 | Rossi et al. |
| 2014/0118285 A1 | 5/2014 | Poplawski |
| 2014/0129034 A1 | 5/2014 | Stefanski et al. |
| 2014/0149270 A1 | 5/2014 | Lombard et al. |
| 2014/0151456 A1 | 6/2014 | McCurnin et al. |
| 2014/0152631 A1 | 6/2014 | Moore et al. |
| 2014/0156087 A1 | 6/2014 | Amundson |
| 2014/0158338 A1 | 6/2014 | Kates |
| 2014/0165612 A1 | 6/2014 | Qu et al. |
| 2014/0175181 A1 | 6/2014 | Warren et al. |
| 2014/0188288 A1 | 7/2014 | Fisher et al. |
| 2014/0191848 A1 | 7/2014 | Imes et al. |
| 2014/0207291 A1 | 7/2014 | Golden et al. |
| 2014/0207292 A1 | 7/2014 | Ramagem et al. |
| 2014/0214212 A1 | 7/2014 | Leen et al. |
| 2014/0216078 A1 | 8/2014 | Ladd |
| 2014/0217185 A1 | 8/2014 | Bicknell |
| 2014/0217186 A1 | 8/2014 | Kramer et al. |
| 2014/0228983 A1 | 8/2014 | Groskreutz et al. |
| 2014/0231530 A1 | 8/2014 | Warren et al. |
| 2014/0244047 A1 | 8/2014 | Oh et al. |
| 2014/0250397 A1 | 9/2014 | Kannan et al. |
| 2014/0250399 A1 | 9/2014 | Gaherwar |
| 2014/0262196 A1 | 9/2014 | Frank et al. |
| 2014/0262484 A1 | 9/2014 | Khoury et al. |
| 2014/0263679 A1 | 9/2014 | Conner et al. |
| 2014/0267008 A1 | 9/2014 | Jain et al. |
| 2014/0277762 A1 | 9/2014 | Drew |
| 2014/0277769 A1 | 9/2014 | Matsuoka et al. |
| 2014/0277770 A1 | 9/2014 | Aljabari et al. |
| 2014/0299670 A1 | 10/2014 | Ramachandran et al. |
| 2014/0309792 A1 | 10/2014 | Drew |
| 2014/0312129 A1 | 10/2014 | Zikes et al. |
| 2014/0312131 A1 | 10/2014 | Tousignant et al. |
| 2014/0312694 A1 | 10/2014 | Tu et al. |
| 2014/0316585 A1 | 10/2014 | Boesveld et al. |
| 2014/0316586 A1 | 10/2014 | Boesveld et al. |
| 2014/0316587 A1 | 10/2014 | Imes et al. |
| 2014/0317029 A1 | 10/2014 | Matsuoka et al. |
| 2014/0319231 A1 | 10/2014 | Matsuoka et al. |
| 2014/0319236 A1 | 10/2014 | Novotny et al. |
| 2014/0320282 A1 | 10/2014 | Zhang |
| 2014/0321011 A1 | 10/2014 | Bisson et al. |
| 2014/0324232 A1 | 10/2014 | Modi et al. |
| 2014/0330435 A1 | 11/2014 | Stoner et al. |
| 2014/0346239 A1 | 11/2014 | Fadell et al. |
| 2014/0358295 A1 | 12/2014 | Warren et al. |
| 2014/0367475 A1 | 12/2014 | Fadell et al. |
| 2014/0376530 A1 | 12/2014 | Erickson et al. |
| 2014/0376747 A1 | 12/2014 | Mullet et al. |
| 2015/0001361 A1 | 1/2015 | Gagne et al. |
| 2015/0002165 A1 | 1/2015 | Juntunen et al. |
| 2015/0016443 A1 | 1/2015 | Erickson et al. |
| 2015/0025693 A1 | 1/2015 | Wu et al. |
| 2015/0039137 A1 | 2/2015 | Perry et al. |
| 2015/0041551 A1 | 2/2015 | Tessier et al. |
| 2015/0043615 A1 | 2/2015 | Steinberg et al. |
| 2015/0045976 A1 | 2/2015 | Li |
| 2015/0046162 A1 | 2/2015 | Aley-Raz et al. |
| 2015/0053779 A1 | 2/2015 | Adamek et al. |
| 2015/0053780 A1 | 2/2015 | Nelson et al. |
| 2015/0053781 A1 | 2/2015 | Nelson et al. |
| 2015/0058779 A1 | 2/2015 | Bruck et al. |
| 2015/0061859 A1 | 3/2015 | Matsuoka et al. |
| 2015/0066215 A1 | 3/2015 | Buduri |
| 2015/0066216 A1 | 3/2015 | Ramachandran |
| 2015/0066220 A1 | 3/2015 | Sloo et al. |
| 2015/0081106 A1 | 3/2015 | Buduri |
| 2015/0081109 A1 | 3/2015 | Fadell et al. |
| 2015/0081568 A1 | 3/2015 | Land, III |
| 2015/0082225 A1 | 3/2015 | Shearer |
| 2015/0088272 A1 | 3/2015 | Drew |
| 2015/0088318 A1 | 3/2015 | Amundson et al. |
| 2015/0100166 A1 | 4/2015 | Baynes et al. |
| 2015/0100167 A1 | 4/2015 | Sloo et al. |
| 2015/0115045 A1 | 4/2015 | Tu et al. |
| 2015/0115046 A1 | 4/2015 | Warren et al. |
| 2015/0124853 A1 | 5/2015 | Huppi et al. |
| 2015/0127176 A1 | 5/2015 | Bergman et al. |
| 2015/0140994 A1 | 5/2015 | Partheesh et al. |
| 2015/0142180 A1 | 5/2015 | Matsuoka et al. |
| 2015/0144706 A1 | 5/2015 | Robideau et al. |
| 2015/0145653 A1 | 5/2015 | Katingari et al. |
| 2015/0148963 A1 | 5/2015 | Klein et al. |
| 2015/0153057 A1 | 6/2015 | Matsuoka et al. |
| 2015/0153060 A1 | 6/2015 | Stefanski et al. |
| 2015/0156631 A1 | 6/2015 | Ramachandran |
| 2015/0159893 A1 | 6/2015 | Daubman et al. |
| 2015/0159899 A1 | 6/2015 | Bergman et al. |
| 2015/0159902 A1 | 6/2015 | Quam et al. |
| 2015/0159903 A1 | 6/2015 | Marak et al. |
| 2015/0159904 A1 | 6/2015 | Barton |
| 2015/0160691 A1 | 6/2015 | Kadah et al. |
| 2015/0163945 A1 | 6/2015 | Barton et al. |
| 2015/0167995 A1 | 6/2015 | Fadell et al. |
| 2015/0168002 A1 | 6/2015 | Plitkins et al. |
| 2015/0168003 A1 | 6/2015 | Stefanski et al. |
| 2015/0168933 A1 | 6/2015 | Klein et al. |
| 2015/0176854 A1 | 6/2015 | Butler et al. |
| 2015/0176855 A1 | 6/2015 | Geadelmann et al. |
| 2015/0198346 A1 | 7/2015 | Vedpathak |
| 2015/0198347 A1 | 7/2015 | Tessier et al. |
| 2015/0204558 A1 | 7/2015 | Sartain et al. |
| 2015/0204561 A1 | 7/2015 | Sadwick et al. |
| 2015/0204563 A1 | 7/2015 | Imes et al. |
| 2015/0204564 A1 | 7/2015 | Shah |
| 2015/0204565 A1 | 7/2015 | Amundson et al. |
| 2015/0204569 A1 | 7/2015 | Lorenz et al. |
| 2015/0204570 A1 | 7/2015 | Adamik et al. |
| 2015/0205310 A1 | 7/2015 | Amundson et al. |
| 2015/0219357 A1 | 8/2015 | Stefanski et al. |
| 2015/0233594 A1 | 8/2015 | Abe et al. |
| 2015/0233595 A1 | 8/2015 | Fadell et al. |
| 2015/0233596 A1 | 8/2015 | Warren et al. |
| 2015/0234369 A1 | 8/2015 | Wen et al. |

(56) References Cited

U.S. PATENT DOCUMENTS

| | | |
|---|---|---|
| 2015/0241078 A1 | 8/2015 | Matsuoka et al. |
| 2015/0245189 A1 | 8/2015 | Nalluri et al. |
| 2015/0248118 A1 | 9/2015 | Li et al. |
| 2015/0249605 A1 | 9/2015 | Erickson et al. |
| 2015/0260424 A1 | 9/2015 | Fadell et al. |
| 2015/0267935 A1 | 9/2015 | Devenish et al. |
| 2015/0268652 A1 | 9/2015 | Lunacek et al. |
| 2015/0276237 A1 | 10/2015 | Daniels et al. |
| 2015/0276238 A1 | 10/2015 | Matsuoka et al. |
| 2015/0276239 A1 | 10/2015 | Fadell et al. |
| 2015/0276254 A1 | 10/2015 | Nemcek et al. |
| 2015/0276266 A1 | 10/2015 | Warren et al. |
| 2015/0277463 A1 | 10/2015 | Hazzard et al. |
| 2015/0277492 A1 | 10/2015 | Chau et al. |
| 2015/0280935 A1 | 10/2015 | Poplawski et al. |
| 2015/0287310 A1 | 10/2015 | Deiuliis et al. |
| 2015/0292764 A1 | 10/2015 | Land et al. |
| 2015/0292765 A1 | 10/2015 | Matsuoka et al. |
| 2015/0293541 A1 | 10/2015 | Fadell et al. |
| 2015/0300672 A1 | 10/2015 | Fadell et al. |
| 2015/0312696 A1 | 10/2015 | Ribbich et al. |
| 2015/0316285 A1 | 11/2015 | Clifton et al. |
| 2015/0316286 A1 | 11/2015 | Roher |
| 2015/0316902 A1 | 11/2015 | Wenzel et al. |
| 2015/0323212 A1 | 11/2015 | Warren et al. |
| 2015/0327010 A1 | 11/2015 | Gottschalk et al. |
| 2015/0327084 A1 | 11/2015 | Ramachandran et al. |
| 2015/0327375 A1 | 11/2015 | Bick et al. |
| 2015/0330654 A1 | 11/2015 | Matsuoka |
| 2015/0330658 A1 | 11/2015 | Filson et al. |
| 2015/0330660 A1 | 11/2015 | Filson et al. |
| 2015/0332150 A1 | 11/2015 | Thompson |
| 2015/0338117 A1 | 11/2015 | Henneberger et al. |
| 2015/0345818 A1 | 12/2015 | Oh et al. |
| 2015/0348554 A1 | 12/2015 | Orr et al. |
| 2015/0354844 A1 | 12/2015 | Kates |
| 2015/0354846 A1 | 12/2015 | Hales et al. |
| 2015/0355371 A1* | 12/2015 | Ableitner ............ G05D 23/1902 236/1 C |
| 2015/0362208 A1 | 12/2015 | Novotny et al. |
| 2015/0362926 A1 | 12/2015 | Yarde et al. |
| 2015/0362927 A1 | 12/2015 | Giorgi |
| 2015/0364135 A1 | 12/2015 | Kolavennu et al. |
| 2015/0370270 A1 | 12/2015 | Pan et al. |
| 2015/0370272 A1 | 12/2015 | Reddy et al. |
| 2015/0370615 A1 | 12/2015 | Pi-Sunyer |
| 2015/0370621 A1 | 12/2015 | Karp et al. |
| 2015/0372832 A1 | 12/2015 | Kortz et al. |
| 2015/0372834 A1 | 12/2015 | Karp et al. |
| 2015/0372999 A1 | 12/2015 | Pi-Sunyer |
| 2016/0006274 A1 | 1/2016 | Tu et al. |
| 2016/0006577 A1 | 1/2016 | Logan |
| 2016/0010880 A1 | 1/2016 | Bravard et al. |
| 2016/0018122 A1 | 1/2016 | Frank et al. |
| 2016/0018127 A1 | 1/2016 | Gourlay et al. |
| 2016/0020590 A1 | 1/2016 | Roosli et al. |
| 2016/0026194 A1 | 1/2016 | Mucignat et al. |
| 2016/0036227 A1 | 2/2016 | Schultz et al. |
| 2016/0040903 A1 | 2/2016 | Emmons et al. |
| 2016/0047569 A1 | 2/2016 | Fadell et al. |
| 2016/0054022 A1 | 2/2016 | Matas et al. |
| 2016/0054792 A1 | 2/2016 | Poupyrev |
| 2016/0054988 A1 | 2/2016 | Desire |
| 2016/0061471 A1 | 3/2016 | Eicher et al. |
| 2016/0061474 A1 | 3/2016 | Cheung et al. |
| 2016/0069582 A1 | 3/2016 | Buduri |
| 2016/0069583 A1 | 3/2016 | Fadell et al. |
| 2016/0077532 A1 | 3/2016 | Lagerstedt et al. |
| 2016/0088041 A1 | 3/2016 | Nichols |
| 2016/0107820 A1 | 4/2016 | MacVittie et al. |
| 2016/0138819 A1 | 5/2016 | Vega |
| 2016/0171289 A1 | 6/2016 | Lee et al. |
| 2016/0180663 A1 | 6/2016 | McMahan et al. |
| 2016/0223216 A1 | 8/2016 | Buda et al. |
| 2016/0249437 A1 | 8/2016 | Sun et al. |
| 2016/0327298 A1 | 11/2016 | Sinha et al. |
| 2016/0327299 A1 | 11/2016 | Ribbich et al. |
| 2016/0327300 A1 | 11/2016 | Ribbich et al. |
| 2016/0327301 A1 | 11/2016 | Ribbich et al. |
| 2016/0327302 A1 | 11/2016 | Ribbich et al. |
| 2016/0327921 A1 | 11/2016 | Ribbich et al. |
| 2016/0330084 A1 | 11/2016 | Hunter et al. |
| 2016/0377306 A1 | 12/2016 | Drees et al. |
| 2017/0041454 A1 | 2/2017 | Nicholls et al. |
| 2017/0059197 A1 | 3/2017 | Goyal et al. |
| 2017/0074536 A1 | 3/2017 | Bentz et al. |
| 2017/0074537 A1 | 3/2017 | Bentz et al. |
| 2017/0074539 A1 | 3/2017 | Bentz et al. |
| 2017/0074541 A1 | 3/2017 | Bentz et al. |
| 2017/0075510 A1 | 3/2017 | Bentz et al. |
| 2017/0075568 A1 | 3/2017 | Bentz et al. |
| 2017/0076263 A1 | 3/2017 | Bentz et al. |
| 2017/0102162 A1 | 4/2017 | Drees et al. |
| 2017/0102433 A1 | 4/2017 | Wenzel et al. |
| 2017/0102434 A1 | 4/2017 | Wenzel et al. |
| 2017/0102675 A1 | 4/2017 | Drees |
| 2017/0102723 A1 | 4/2017 | Smith et al. |
| 2017/0103483 A1 | 4/2017 | Drees et al. |
| 2017/0104332 A1 | 4/2017 | Wenzel et al. |
| 2017/0104336 A1 | 4/2017 | Elbsat et al. |
| 2017/0104337 A1 | 4/2017 | Drees |
| 2017/0104342 A1 | 4/2017 | Elbsat et al. |
| 2017/0104343 A1 | 4/2017 | Elbsat et al. |
| 2017/0104344 A1 | 4/2017 | Wenzel et al. |
| 2017/0104345 A1 | 4/2017 | Wenzel et al. |
| 2017/0104346 A1 | 4/2017 | Wenzel et al. |
| 2017/0104449 A1 | 4/2017 | Drees |
| 2017/0122613 A1 | 5/2017 | Sinha et al. |
| 2017/0122617 A1 | 5/2017 | Sinha et al. |
| 2017/0123391 A1 | 5/2017 | Sinha et al. |
| 2017/0124838 A1 | 5/2017 | Sinha et al. |
| 2017/0124842 A1 | 5/2017 | Sinha et al. |
| 2017/0131825 A1 | 5/2017 | Moore et al. |
| 2017/0192402 A1 | 7/2017 | Karp et al. |
| 2017/0263111 A1 | 9/2017 | Deluliis et al. |
| 2017/0292731 A1 | 10/2017 | Matsuoka et al. |
| 2017/0295058 A1 | 10/2017 | Gottschalk et al. |
| 2017/0357607 A1 | 12/2017 | Cayemberg et al. |
| 2018/0023833 A1 | 1/2018 | Matsuoka et al. |
| 2018/0087795 A1 | 3/2018 | Okita et al. |
| 2018/0123821 A1 | 5/2018 | Alberth, Jr. |
| 2018/0124178 A1 | 5/2018 | Alberth, Jr. |

FOREIGN PATENT DOCUMENTS

| | | |
|---|---|---|
| CA | 2633121 | 8/2011 |
| CA | 2818356 | 5/2012 |
| CA | 2818696 A1 | 5/2012 |
| CA | 2853041 | 4/2013 |
| CA | 2853081 A1 | 4/2013 |
| CA | 2812567 | 5/2014 |
| CA | 2886531 A1 | 9/2015 |
| CA | 2894359 A1 | 12/2015 |
| CN | 200979666 Y | 11/2007 |
| DE | 102004005962 | 8/2005 |
| EP | 2283279 A2 | 2/2011 |
| EP | 2738478 | 6/2014 |
| EP | 2897018 A1 | 7/2015 |
| EP | 2988188 A2 | 2/2016 |
| GB | 2519441 A | 4/2015 |
| JP | 2015-500974 A | 1/2015 |
| WO | WO 00/22491 A1 | 4/2000 |
| WO | WO 2006/041599 A9 | 7/2006 |
| WO | WO 2009/006133 A1 | 1/2009 |
| WO | WO 2009/058127 A1 | 5/2009 |
| WO | WO 2009/036764 A3 | 1/2010 |
| WO | WO 2010/059143 A1 | 5/2010 |
| WO | WO 2010/078459 A1 | 7/2010 |
| WO | WO 2010/088663 A1 | 8/2010 |
| WO | WO 2012/042232 | 4/2012 |
| WO | WO 2012/068436 A1 | 5/2012 |
| WO | WO 2012/068495 A1 | 5/2012 |
| WO | WO 2012/068503 A1 | 5/2012 |
| WO | WO 2012/068507 A3 | 5/2012 |

(56) References Cited

FOREIGN PATENT DOCUMENTS

| | | |
|---|---|---|
| WO | WO 2012/068517 A1 | 5/2012 |
| WO | WO 2012/068526 A1 | 5/2012 |
| WO | WO 2013/033469 A1 | 3/2013 |
| WO | WO 2013/052389 A1 | 4/2013 |
| WO | WO 2013/052905 A1 | 4/2013 |
| WO | WO 2013/058933 A1 | 4/2013 |
| WO | WO 2013/058934 | 4/2013 |
| WO | WO 2013/058968 A1 | 4/2013 |
| WO | WO 2013/058969 A1 | 4/2013 |
| WO | WO 2013/059684 A1 | 4/2013 |
| WO | WO 2012/142477 A3 | 8/2013 |
| WO | WO 2013/153480 A3 | 12/2013 |
| WO | WO 2014/047501 A1 | 3/2014 |
| WO | WO 2012/068437 A3 | 4/2014 |
| WO | WO 2012/068459 A3 | 4/2014 |
| WO | WO 2013/058932 | 4/2014 |
| WO | WO 2014/051632 A1 | 4/2014 |
| WO | WO 2014/051635 A1 | 4/2014 |
| WO | WO 2014/055059 A1 | 4/2014 |
| WO | WO 2013/052901 A3 | 5/2014 |
| WO | WO 2014/152301 A2 | 9/2014 |
| WO | WO 2014/152301 A3 | 9/2014 |
| WO | WO 2015/012449 | 1/2015 |
| WO | WO 2015/039178 A1 | 3/2015 |
| WO | WO 2015/054272 A2 | 4/2015 |
| WO | WO 2015/057698 A1 | 4/2015 |
| WO | WO 2015/099721 A1 | 7/2015 |
| WO | WO-2015/127499 A1 | 9/2015 |
| WO | WO 2015/127566 A1 | 9/2015 |
| WO | WO 2015/134755 A3 | 10/2015 |
| WO | WO 2015/195772 A1 | 12/2015 |
| WO | WO 2016/038374 A1 | 3/2016 |
| WO | WO 2017/044903 A1 | 3/2017 |

OTHER PUBLICATIONS

Office Action for U.S. Appl. No. 15/146,134, dated May 14, 2018, 21 pages.
Office Action for U.S. Appl. No. 15/336,793, dated May 23, 2018, 18 pages.
Unknown, National Semiconductor's Temperature Sensor Handbook, Nov. 1, 1997, retrieved from the Internet at http://shrubbery.net/~heas/willem/PDF/NSC/temphb.pdf on Aug. 11, 2016, pp. 1-40.
Search Report for International Application No. PCT/US2016/030291, dated Sep. 7, 2016, 11 pages.
Search Report for International Application No. PCT/US2016/030827 dated Sep. 7, 2016, 13 pages.
Search Report for International Application No. PCT/US2016/030829, dated Sep. 7, 2016, 15 pages.
Search Report for International Application No. PCT/US2016/030835, dated Sep. 7, 2016, 13 pages.
Search Report for International Application No. PCT/US2016/030836, dated Sep. 7, 2016, 11 pages.
Search Report for International Application No. PCT/US2016/030837, dated Sep. 7, 2016, 13 pages.
Search Report for International Application No. PCT/US2016/051176, dated Feb. 16, 2017, 20 pages.
Search Report for International Application No. PCT/US2017/012217, dated Mar. 31, 2017, 14 pages.
Search Report for International Application No. PCT/US2017/012218, dated Mar. 31, 2017, 14 pages.
Search Report for International Application No. PCT/US2017/012221, dated Mar. 31, 2017, 13 pages.
Search Report for International Application No. PCT/US2017/030890, dated Jun. 21, 2017, 13 pages.
Notice of Allowance for U.S. Appl. No. 15/146,649, dated Feb. 27, 2018, 7 pages.
Notice of Allowance for U.S. Appl. No. 15/146,763, dated Oct. 4, 2017, 8 pages.
Office Action for U.S. Appl. No. 15/146,649, dated Oct. 6, 2017, 6 pages.
Office Action for U.S. Appl. No. 15/146,749, dated Mar. 19, 2018, 11 pages.
Office Action for U.S. Appl. No. 15/146,749, dated Oct. 4, 2017, 9 pages.
Office Action for U.S. Appl. No. 15/260,294, dated Feb. 16, 2018, 19 pages.
Office Action for U.S. Appl. No. 15/260,297, dated Feb. 9, 2018, 17 pages.
Office Action for U.S. Appl. No. 15/260,301, dated Feb. 9, 2018, 9 pages.
Office Action for U.S. Appl. No. 15/336,789, dated Aug. 10, 2017, 14 pages.
Office Action for U.S. Appl. No. 15/336,789, dated Feb. 22, 2018, 15 pages.
Office Action for U.S. Appl. No. 15/336,791, dated Mar. 2, 2018, 13 pages.
Office Action for U.S. Appl. No. 15/336,792, dated Mar. 29, 2018, 12 pages.
Office Action for U.S. Appl. No. 15/336,792, dated Oct. 10, 2017, 12 pages.
Written Opinion for Singapore Application No. 11201708996V, dated Dec. 27, 2017, 6 pages.
Written Opinion for Singapore Application No. 11201708997W, dated Jan. 10, 2018, 9 pages.
Written Opinion for Singapore Application No. 11201709002Y, dated Feb. 7, 2018, 5 pages.
Cuevas et al., Integrating Gesture-Based Identification in Context-Aware Applications: A System Approach, 2014, 8 pages.
Hayashi et al: "Wave to Me: Human Factors in Computing Systems", ACM, 2 Penn Plaza, Suite 701 New York, NY 10121-0701 USA, Apr. 26, 2014, pp. 3453-3462.
Search Report for International Application No. PCT/US2017/054915, dated Jan. 16, 2018, 14 pages.
First Examination Report for New Zealand Application No. 737432, dated Jun. 11, 2018, 6 pages.
First Examination Report for New Zealand Application No. 737663, dated Jun. 11, 2018, 3 pages.
Notice of Allowance for U.S. Appl. No. 15/338,215, dated May 21, 2018, 8 pages.
Office Action for U.S. Appl. No. 15/260,293, dated Jun. 1, 2018, 23 pages.
Office Action for U.S. Appl. No. 15/260,299, dated Jun. 1, 2018, 14 pages.
Office Action for U.S. Appl. No. 15/338,215, dated Nov. 15, 2017, 11 pages.
Office Action for U.S. Appl. No. 15/360,976, dated Jul. 2, 2018, 8 pages.
Foreign Action other than Search Report on IN 201727040519 dated Dec. 27, 2019.
Office Action on IN 201727040519, dated Dec. 27, 2019, 6 pages.

\* cited by examiner

USER CONTROL DEVICE WITH CANTILEVERED DISPLAY

CROSS-REFERENCE TO RELATED PATENT APPLICATIONS

The present application is a continuation of U.S. application Ser. No. 15/146,649, filed May 4, 2016, which claims the benefit of U.S. Provisional Application No. 62/156,868, filed May 4, 2015, U.S. Provisional Application No. 62/247,672, filed Oct. 28, 2015, U.S. Provisional Application No. 62/260,141 filed Nov. 25, 2015, U.S. Provisional Application No. 62/274,750, filed Jan. 4, 2016, U.S. Provisional Application No. 62/275,199, filed Jan. 5, 2016, U.S. Provisional Application No. 62/275,202, filed Jan. 5, 2016, U.S. Provisional Application No. 62/275,204, filed Jan. 5, 2016, and U.S. Provisional Application No. 62/275,711, filed Jan. 6, 2016, all of which are incorporated herein by reference in their entireties.

BACKGROUND

The present disclosure relates generally to user control devices and more particularly to thermostats for controlling a building or space's heating, ventilating, and air conditioning (HVAC) system.

A thermostat is, in general, a component of an HVAC control system. Traditional thermostats sense the temperature or other parameters (e.g., humidity) of a system and control components of the HVAC system in order to maintain a set point for the temperature or other parameter. A thermostat may be designed to control a heating or cooling system or an air conditioner. Thermostats are manufactured in many ways, and use a variety of sensors to measure temperature and other desired parameters of a system.

Conventional thermostats are configured for one-way communication to connected components, and to control HVAC systems by turning on or off certain components or by regulating flow. Each thermostat may include a temperature sensor and a user interface. The user interface typically includes display for presenting information to a user and one or more user interface elements for receiving input from a user. To control the temperature of a building or space, a user adjusts the set point via the thermostat's user interface.

SUMMARY

One embodiment of the invention relates to a thermostat including a housing, a touch-sensitive display configured to display visual media and receive user inputs, and processing electronics configured to operate the touch-sensitive display. The housing includes a base and a display mount. The base includes a top wall, a bottom wall, a front wall connecting the top wall to the bottom wall, a first side wall connecting the top wall to the bottom wall, and a second side wall connecting the top wall to the bottom wall. The top wall, the bottom wall, the first side wall, and the second side wall define an internal volume. The display mount is cantilevered away from the top wall and includes a mounting surface. The touch-sensitive display is attached to the mounting surface of the display mount. The processing electronics are positioned within the interior volume of the base.

Another embodiment of the invention relates to a thermostat including a housing, a touch-sensitive display configured to display visual media and receive user inputs, processing electronics configured to operate the touch-sensitive display, multiple wire terminals each configured to secure one of multiple control wires from a heating, ventilation, and air conditioning system, a mounting plate configured for attaching the housing to a mounting surface, a front cover removably attached to the housing, and a top cover removably attached to the housing. The housing includes a base and a display mount. The base includes a top wall, a bottom wall, a front wall connecting the top wall to the bottom wall, a first side wall connecting the top wall to the bottom wall, and a second side wall connecting the top wall to the bottom wall. The top wall, the bottom wall, the first side wall, and the second side wall define an internal volume. The ends of the top wall, the bottom wall, the first side, and the second side wall distal from the front wall define a planar rear face of the base. The display mount is cantilevered upward from the top wall and includes a mounting surface perpendicular to the top wall of the base. The touch-sensitive display is attached to the mounting surface of the display mount. The processing electronics are positioned within the interior volume of the base. The wire terminals are positioned within the internal volume. The mounting plate is positioned within the internal volume of the base and removably attached to the base. The mounting plate includes an aperture configured to allow the plurality controls wires to pass through the mounting plate into the internal volume of the base. The mounting plate includes a rear surface that is flush with the rear face of the base when the mounting plate is attached to the base. The front cover covers at least a portion of the front wall and covers at least a portion of the bottom wall. The top cover covers at least a portion of the top wall, covers at least a portion of the first side wall, and covers at least a portion of the second side wall.

Another embodiment of the invention relates to a thermostat including a housing, a touch-sensitive display configured to display visual media and receive user inputs, and processing electronics configured to operate the touch-sensitive display. The housing includes a base defining an internal volume and a display mount extending away from the base. The display mount includes a mounting surface. The touch-sensitive display is attached to the mounting surface of the display mount. The processing electronics are positioned within the interior volume of the base.

Another embodiment of the invention relates to a thermostat for use in a home control system for controlling building equipment. The thermostat includes a touch-sensitive display and a housing comprising electronic circuitry configured to monitor and control the building equipment. The housing is configured to attach to a mounting surface. The touch-sensitive display is cantilevered from the housing such that only a first end of the touch-sensitive display is connected to the housing.

In some embodiments, the touch-sensitive display of the thermostat is transparent or translucent such that the mounting surface to which the thermostat is to be mounted is visible through the touch-sensitive display. The touch-sensitive display may include an organic light-emitting diode and may also be flexible. The housing may include at least one sensor from the group consisting of a temperature sensor, a humidity sensor, an air quality sensor, a proximity sensor, an ambient light sensor, and a biometric sensor. In addition, the housing may further includes a rear surface that extends along a first plane and is configured to be attached to the mounting surface, and the touch-sensitive display may extend along a second plane that is substantially parallel to the first plane such that the first plane is spaced a distance from the second plane.

In some embodiments, the thermostat may further include a light source configured to emit ambient light. The light source may be attached to the housing. The light source device may also be arranged to provide light to a waveguide around a perimeter of the touch-sensitive display and be configured to emit light from the perimeter of the touch-sensitive display. The light source may be configured to emit light in a direction toward the mounting surface and/or in a direction away from the mounting surface.

In some embodiments, all of the electronic components of the thermostat except for the touch-sensitive display are located within the housing. The housing may include a first end extending along a first plane and configured to attach to the mounting surface, and a second end offset a distance from the first plane and from which the touch-sensitive display extends. The housing may include a housing body having a rear surface configured to connect to the mounting surface. The housing may also include a removable front panel having a contour that matches a contour of at least a portion of the touch-sensitive display. The removable front panel may curve downward and rearward from a forward-most point of the removable front panel relative to the rear surface of the housing body to a point of the removable front panel nearest the rear surface of the housing body. An upper edge of the removable front panel may be located is adjacent a lower edge of the touch-sensitive display.

DETAILED DESCRIPTION

Figure 1:
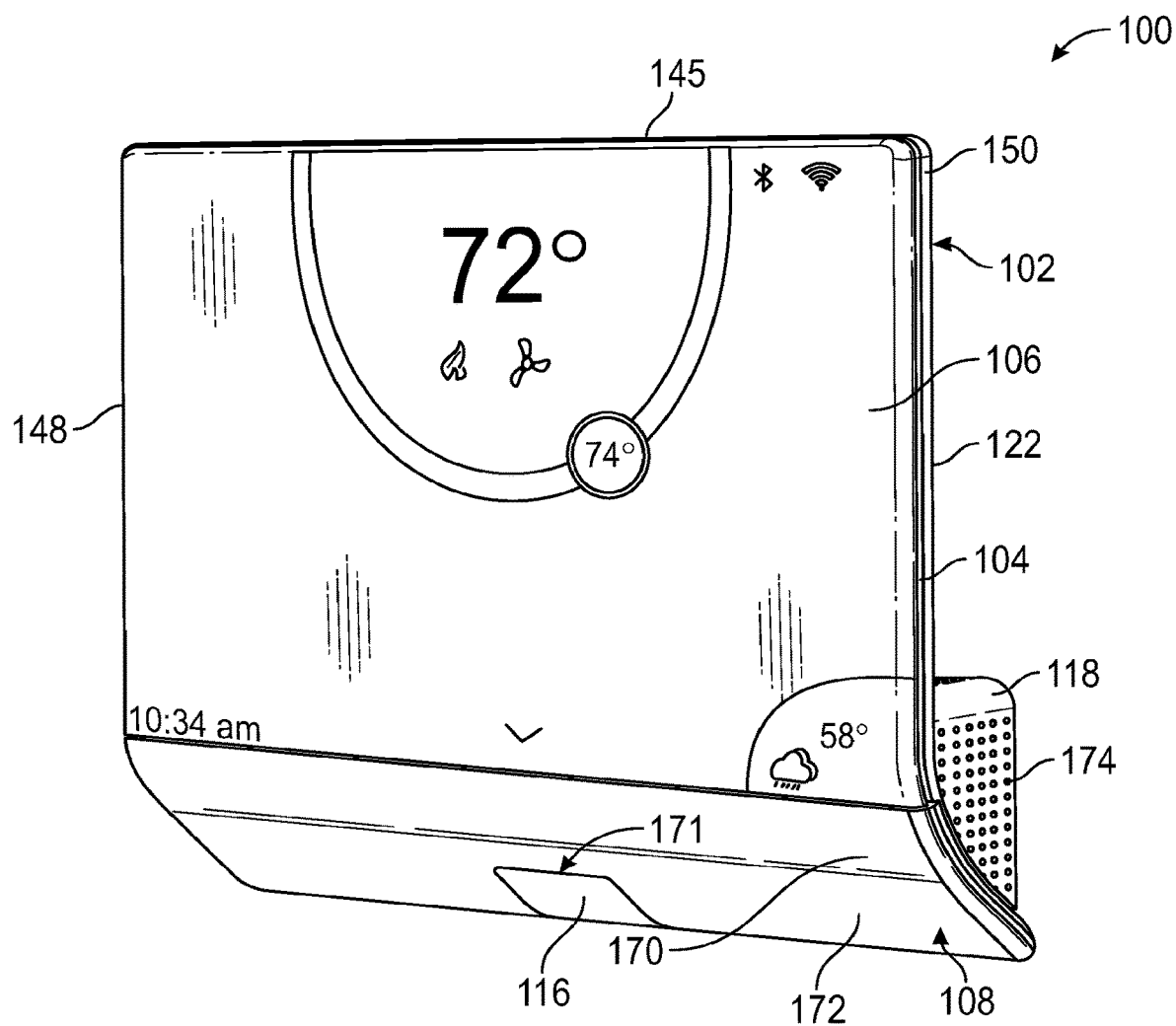
FIG. 1 is a front perspective view from above of a thermostat according to an exemplary embodiment, with visual media displayed.
Figure 2:
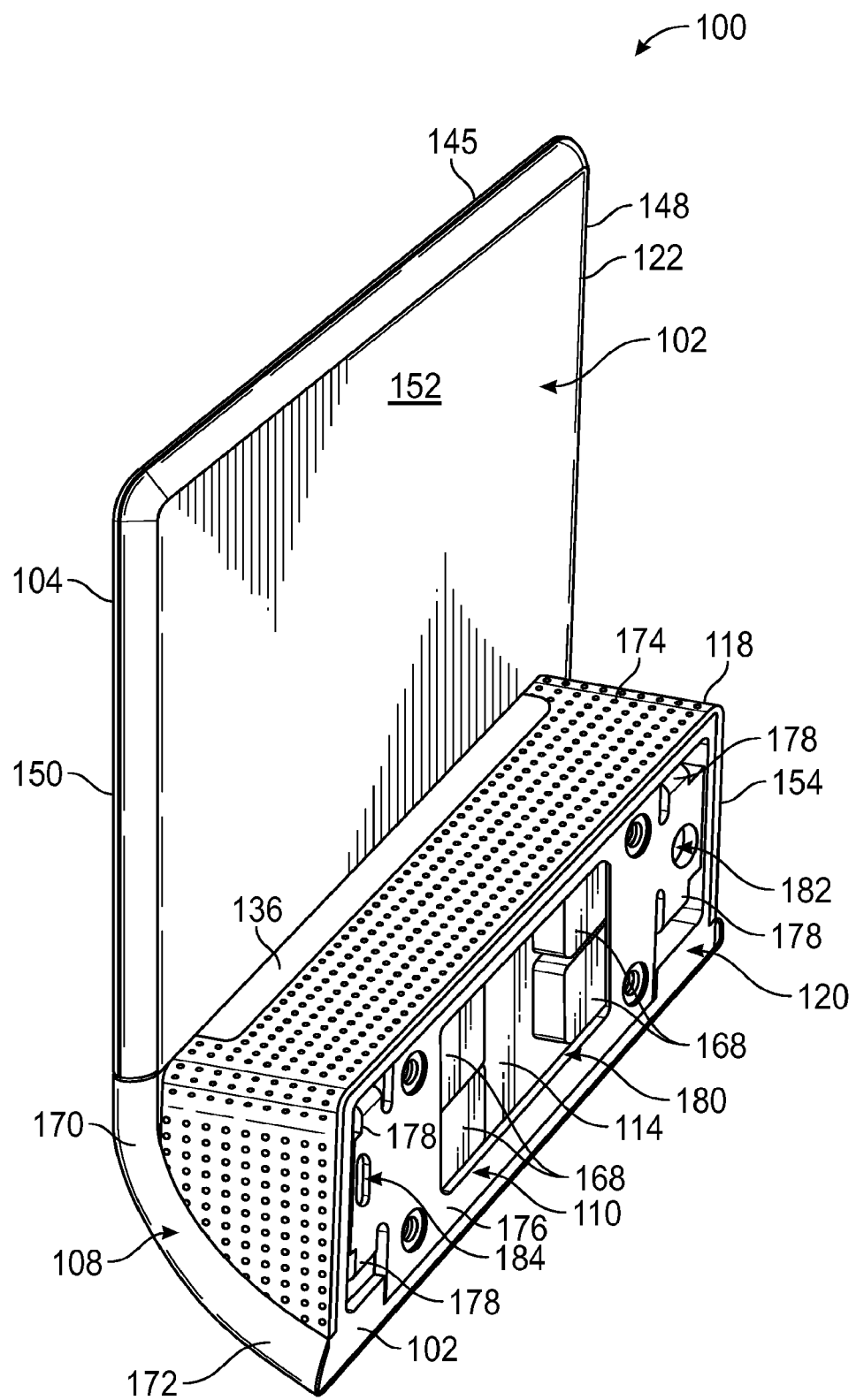
FIG. 2 is a rear perspective view from above of the thermostat of FIG. 1.
Figure 3:
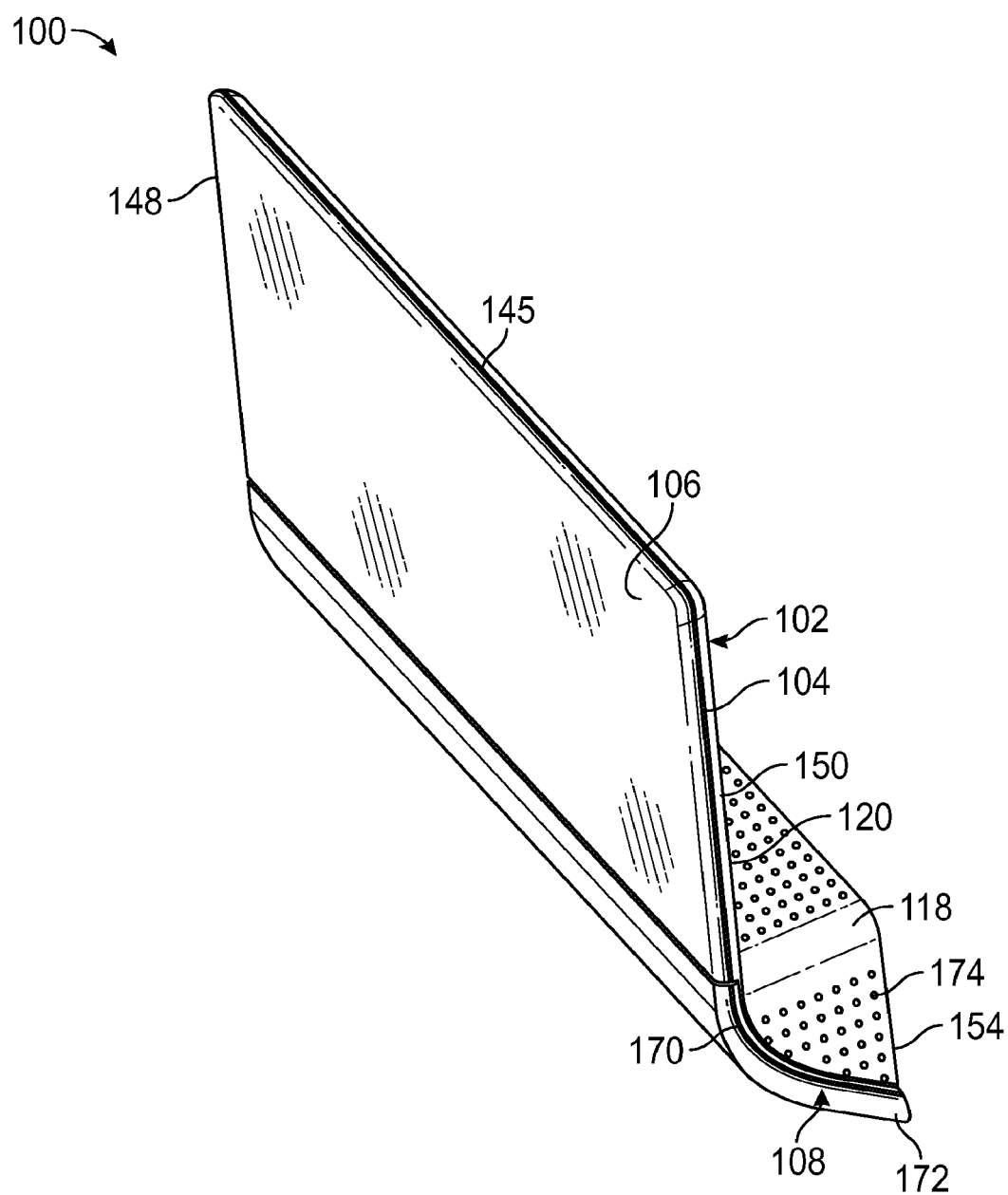
FIG. 3 is a front perspective view from above of the thermostat of FIG. 1 without visual media displayed.

Referring generally to the Figures, a multi-function user control device is shown, according to various exemplary embodiments. The user control device may be implanted as a thermostat to control a HVAC system. The user control device may be implemented as a smart hub and may be connected to any of a variety of controllable systems and devices. For example, the user control device may be connected to a home automation system, a building automation system, an HVAC system, a lighting system, a security system, an electrical system, a sprinkler system, a home entertainment system, and/or any other type of system that can be monitored or controlled via a user control device. The user control device may be implemented in any of a variety of environments (e.g., a home, a building, a classroom, a hotel, a healthcare facility, a vehicle, etc.) and used to monitor, control, and/or facilitate user interaction with controllable systems or devices in such environments. For example, the user control device may be a thermostat installed in a home or building (e.g., mounted on a wall).

The user control device includes a housing that contains electronic components and a touch-sensitive display for displaying visual media (e.g., information, text, graphics, etc.) to a user and receiving user inputs. The housing is selectively attached to a mounting plate to mount the user control device to a mounting surface such as a wall. The housing includes a display mount or support plate that supports the touch-sensitive display. The display mount is cantilevered vertically from the base of the housing such that the entire touch-sensitive display and the display mount are spaced a distance away from the wall when the user control device is attached to a wall. The touch-sensitive display, the display mount, and a protective cover for the display are not opaque (e.g., transparent or translucent), which minimizes the visible footprint of the user control device to a user relative to conventional opaque user control devices. The housing may also include one or more light sources. The light sources may be configured to emit light toward the wall, thereby creating lighting effects on the wall. The light sources may also emit light in alternative or additional directions.

The user control device can be equipped with one or more of a variety of sensors (e.g., temperature, humidity, air quality, proximity, light, vibration, motion, optical, audio, occupancy, power, security, etc.) configured to sense a variable state or condition of the environment in which the user control device is installed. The user control device may include a variety of user interface devices (e.g., a touch-sensitive panel, an electronic display, speakers, haptic feedback, microphone, ambient lighting, etc.) configured to facilitate user interaction with the user control device. The user control device may include a data communications interface configured to facilitate communications between the user control device and remote sensor units, a building automation system, a home automation system, HVAC equipment, mobile devices (e.g., via WiFi, Bluetooth, NFC, LTE, LAA LTE, etc.), a communications network (e.g., a LAN, WAN, 802.11, the Internet, a cellular network, etc.), and/or any other systems or devices to which the user control device may be connected.

The user control device may be configured to function as a connected smart hub. For example, the user control device may be configured to receive voice commands from a user and control connected equipment in response to the voice commands. The user control device may be configured to connect to mobile devices (e.g., a user's phone, tablet, laptop, etc.) or other networked devices (e.g., a desktop computer) to allow remote monitoring and control of connected systems. The user control device may be configured to detect the occupancy of a room or space in which the user control device is installed and may perform a variety of occupancy-based control processes. The user control device may monitor the performance of connected equipment (e.g., HVAC equipment) and may perform diagnostics based on data received from the HVAC equipment.

The user control device may function as a wireless communications hub (e.g., a wireless router, an access point, etc.) and may be configured to bridge communications between various systems and devices. For example, the user control device may include a cellular communications transceiver, a modem, an Ethernet transceiver, or other communications hardware configured to communicate with an external communications network (e.g., a cellular network, a WAN, the Internet, etc.). The user control device may include a WiFi transceiver configured to communicate with nearby mobile devices. The user control device may be configured to bridge communications between mobile devices and external communications networks. This functionality allows the user control device to replace networking equipment (e.g., a modem, a wireless router, etc.) in building or vehicle and to provide Internet connectivity. For example, the user control device may function as a WiFi hotspot or a micro cell within a building or vehicle and may communicate with the Internet via an integrated Ethernet transceiver, a cellular transceiver (e.g., for locations not serviced by an Internet service provider), a coaxial cable, or other data communications hardware.

The user control device may receive weather forecasts from a weather service and severe weather alerts. The user control device may have ambient lighting components that emit specific light colors or patterns to indicate sever weather alerts or other alerts. The user control device may also receive utility rate information from a utility provider. The user control device may use the weather forecasts in conjunction with the utility rate information to optimize (e.g., minimize) the energy consumption of the home or building. In some embodiments, the user control device generates a utility bill forecast and recommends set point modifications to reduce energy consumption or energy cost. In some embodiments, the user control device receives energy consumption information for other homes/buildings from a remote system and compares the energy consumption of connected HVAC equipment to the energy consumption of the other homes/buildings.

FIGS. 1-18 illustrate a multi-function user control device or thermostat 100, according to an exemplary embodiment. The thermostat 100 is configured to be mounted on a wall (e.g., a vertical wall within a dwelling, home, building, etc.) or other suitable mounting location (e.g., a ledge, a control panel, or other surface of an object within a building space, furniture, a dashboard, a vehicle seat, or other vehicle surface, etc.).

Figure 14:
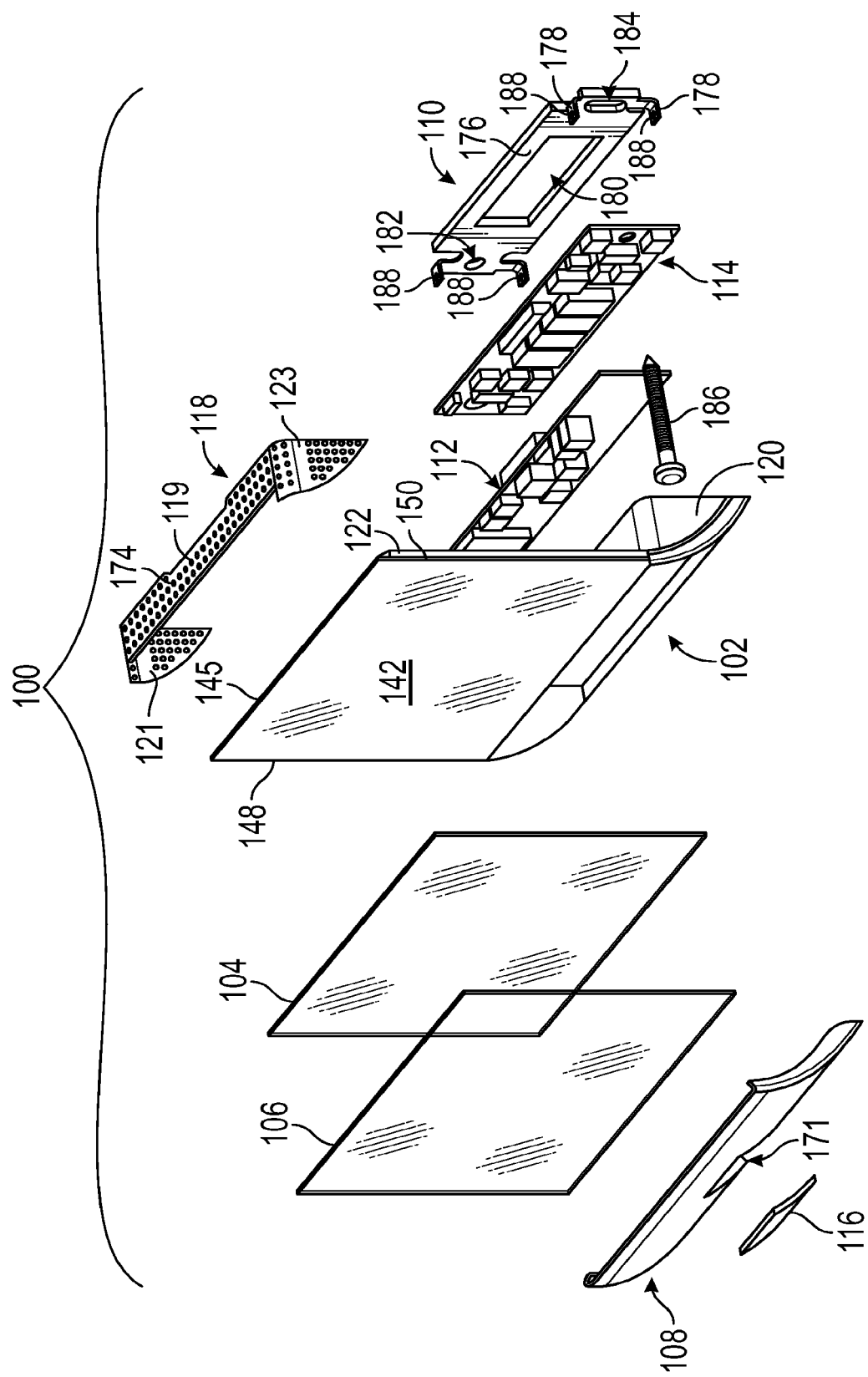
FIG. 14 is an exploded view of the thermostat of FIG. 1.

As shown in FIG. 14, the thermostat 100 includes a housing 102, a touch-sensitive display 104, a protective cover 106 for the display 104, a face plate or front cover 108, a back plate or mounting plate 110, one or more circuit boards, shown as circuit board 112 and circuit board 114, a sensor lens or window 116, and a molding or top cover 118 that covers a portion of the housing 102. The assembled components of the thermostat 100 other than the mounting plate 110 and any fastener or other components used to fasten the mounting plate to the mounting location are referred to as the "thermostat body."

Figure 5:
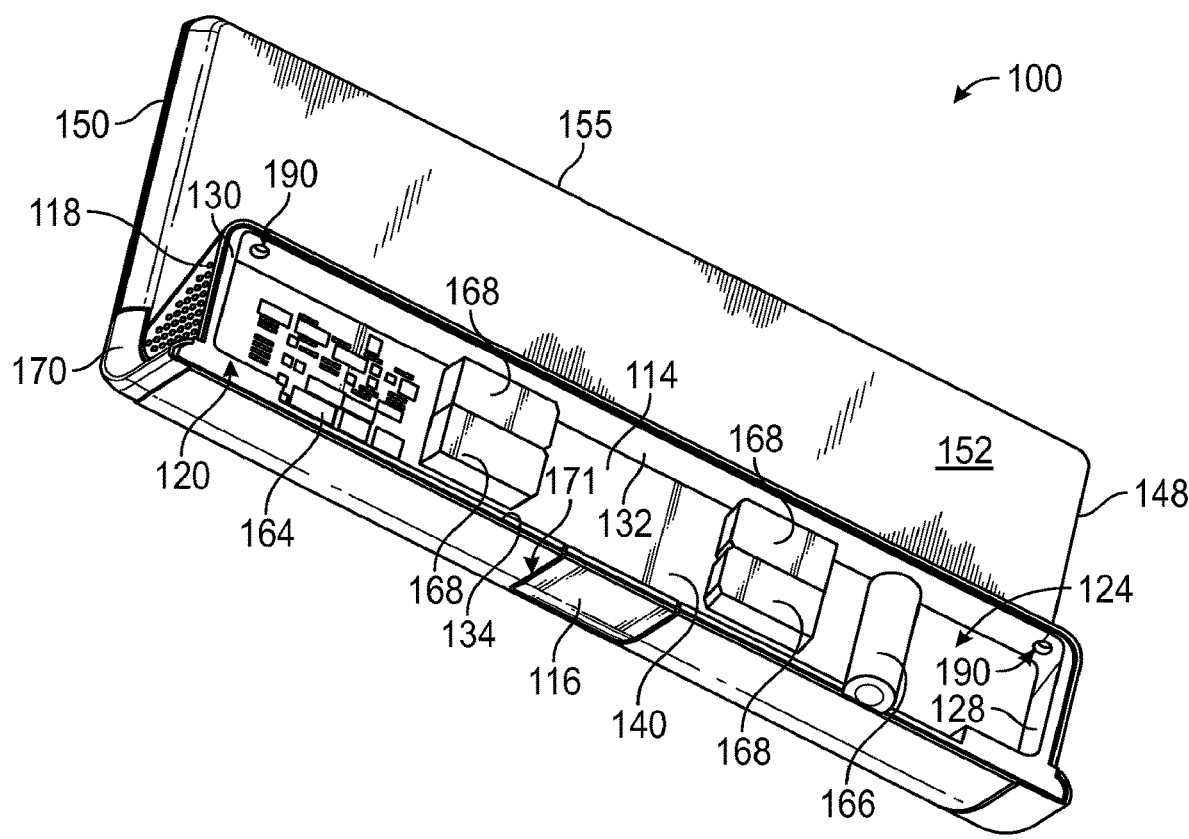
FIG. 5 is a rear perspective view from below of the thermostat of FIG. 1 with a mounting plate not shown.
Figure 8:
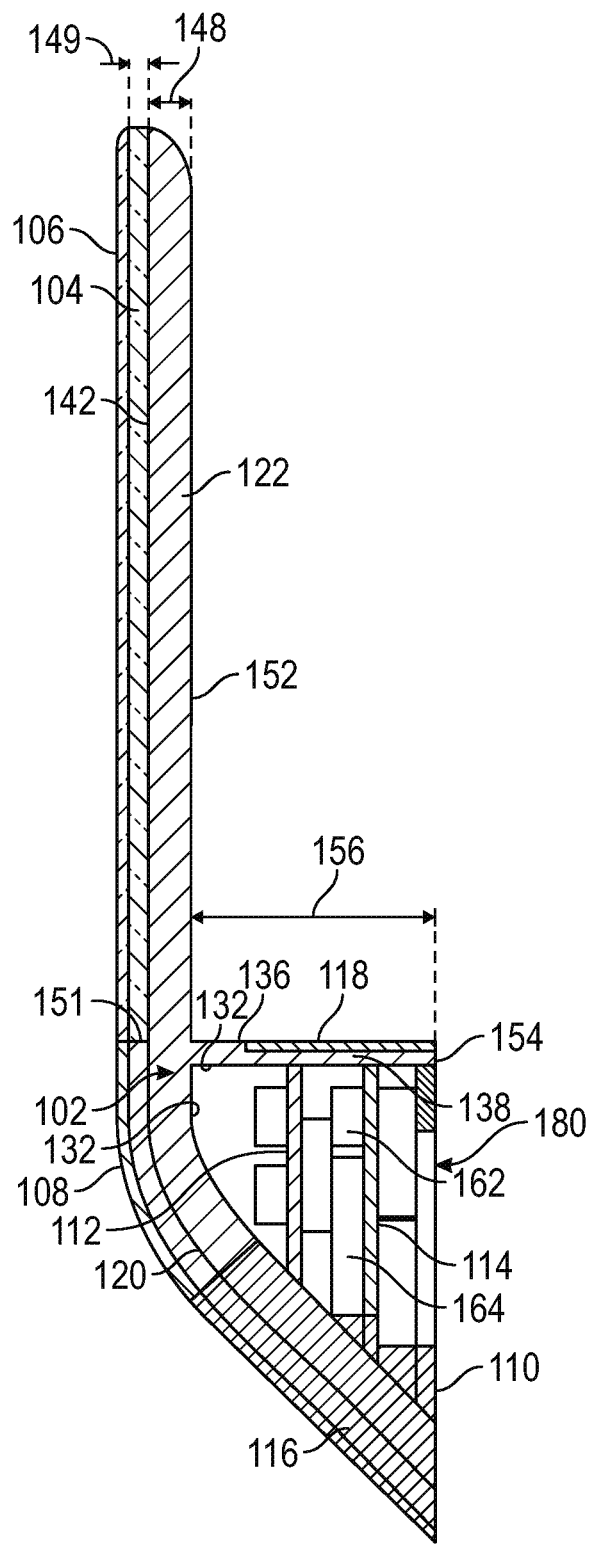
FIG. 8 is a section view of the thermostat of FIG. 1 taken along line 8-8 in FIG. 6.
Figure 9:
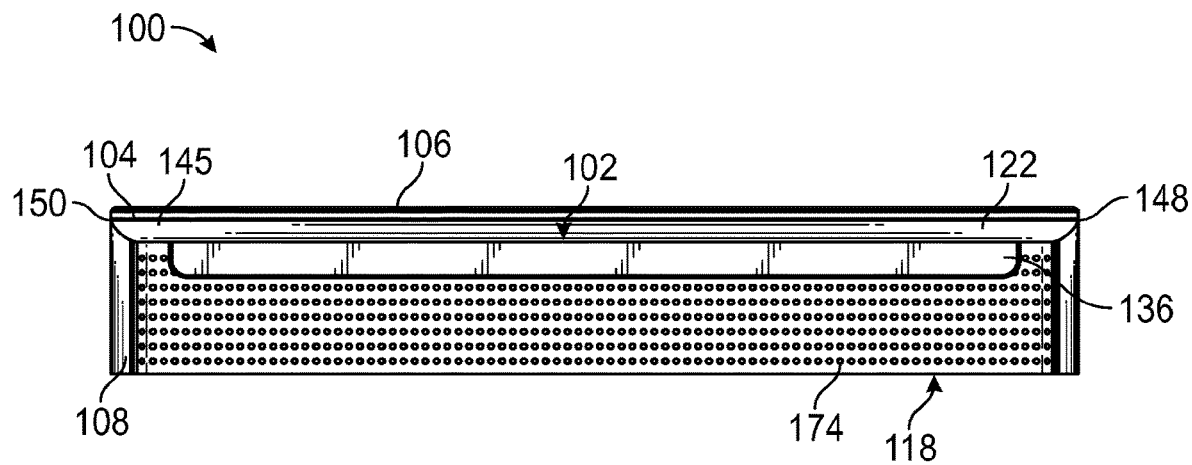
FIG. 9 is a top view of the thermostat of FIG. 1.

As shown in FIGS. 5 and 8, the housing 102 includes a main portion or base 120 and a cantilevered plate or display mount 122 extending from the front of the base 120. The base 120 defines a pocket or volume 124 that the circuit boards 112 and 114 are located within. The volume 124 is defined by a front wall 126, two side walls 128 and 130, a top wall 132, and a bottom wall 134, and is closed by the mounting plate 110 when the thermostat body is attached to the mounting plate 110. The front wall 126 connects the top wall 132 to the bottom wall 134. The two side walls 128 and 130 connect the top wall 132 to the bottom wall 134. The bottom wall 134 angles downward from the vertical front wall 126 at an angel of about 45 degrees. In other embodiments, the angle is greater or smaller (e.g., between 30 degrees and 60 degrees. In other embodiments, the bottom wall or a portion of the bottom wall is curved. In other embodiments, the base 120 of the housing 102 is substantially square or rectangular in cross-section. In other embodiments, the front wall is omitted and an angled or curved bottom wall connects directly to the top wall (e.g., resulting in a housing that is triangular in cross-section). In some embodiments, the front wall is omitted and the volume 124 is open to the front of the base 120, thereby allowing front facing access to the interior of the base 120.

As shown in FIG. 8, the top wall 132 of the base 120 has two sections 136 and 138 with section 138 recessed from section 136 (e.g., thinner, having a smaller vertical dimension, having a smaller height, etc.). The section 138 receives a portion of the top cover 118 so that the top surface of the top cover 118 is flush with the top surface of the section 136 of the top wall 132 as shown in FIG. 8.

Figure 12:
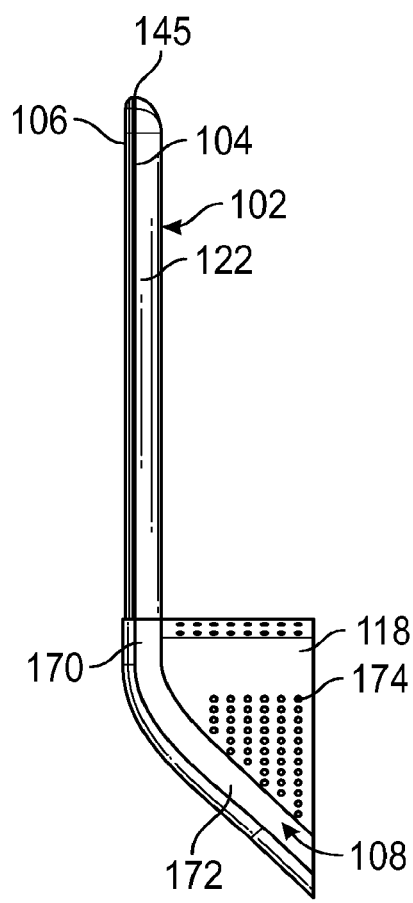
FIG. 12 is a side view of the thermostat of FIG. 1.

As shown in FIGS. 8 and 12, a portion of the front wall 126 extends past the top wall 132 to form a display mount 122 (back plate, mounting plate). The display mount 122 is cantilevered from the base 120. The display mount 122 provides a mounting surface 142 for attaching the display 104 to the housing 102. The display mount 122 has a height 144 (measured from the top surface of the top wall 132, which is the top surface of the section 136 in the illustrated embodiment, to a top or free end 145, a width 146 measured from a first or left side 148 to a second or right side 150, and a thickness 148 measured from the front or mounting surface 142 to a rear or back surface 152. The mounting surface 142 is spaced apart or recessed from the front surface of the portion of the front wall 126 that forms the base 120 by a thickness 149 to form a ledge 151 to support the bottom edges of the touch-sensitive display 104 and the protective cover 106. The thickness 149 is the same as the thickness of the touch-sensitive display 104 to that the ledge 151 supports the bottom of the display 104.

As illustrated, the display mount 122 extends upwardly in a cantilevered fashion from the base 120 so that the display mount 122 is located above the base in the normal operating position of the thermostat. In alternative embodiments, the display mount extends downwardly in a cantilevered fashion from the base so that the display mount is located below the base in the normal operating position of the thermostat. In alternative embodiments, the display mount extends sideways in a cantilevered fashion from the base so that the display mount is located even with and to one side of the base in the normal operating position of the thermostat.

Figure 26:
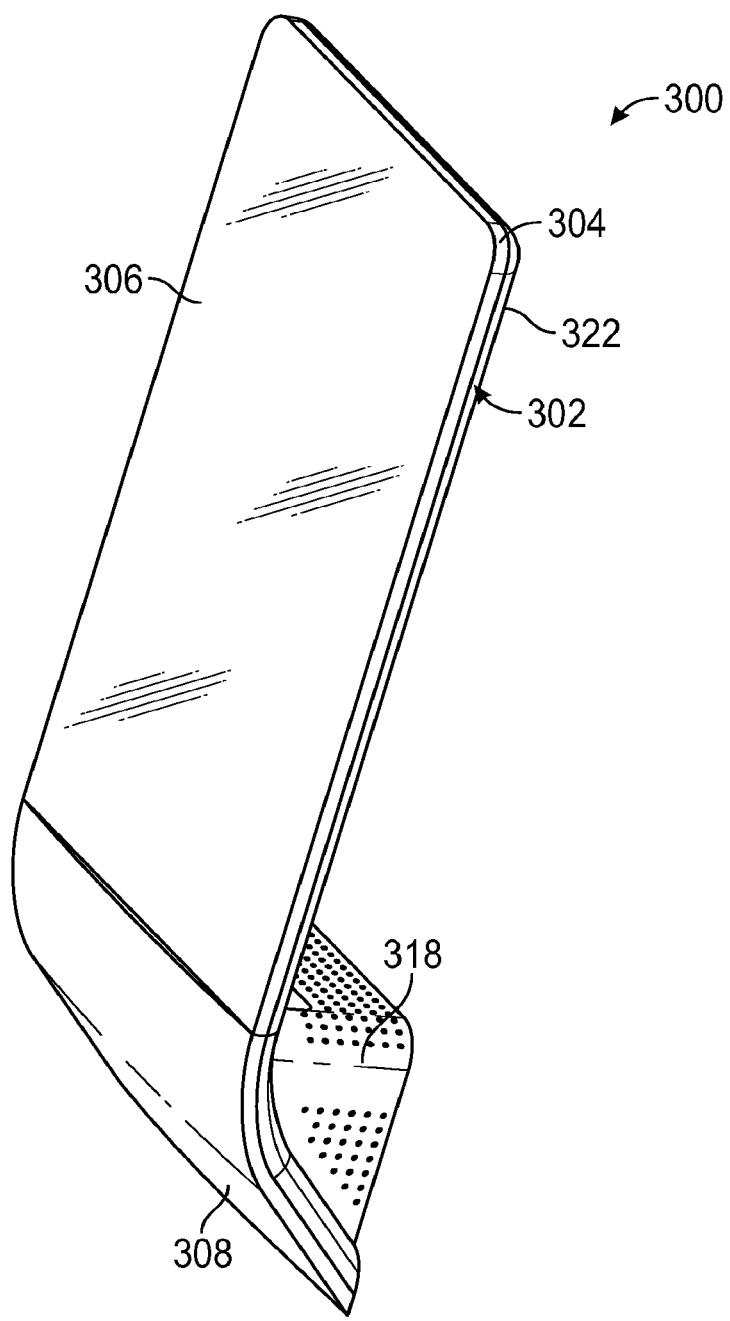
FIG. 26 is a front perspective view from above a thermostat according to an exemplary embodiment.
Figure 27:
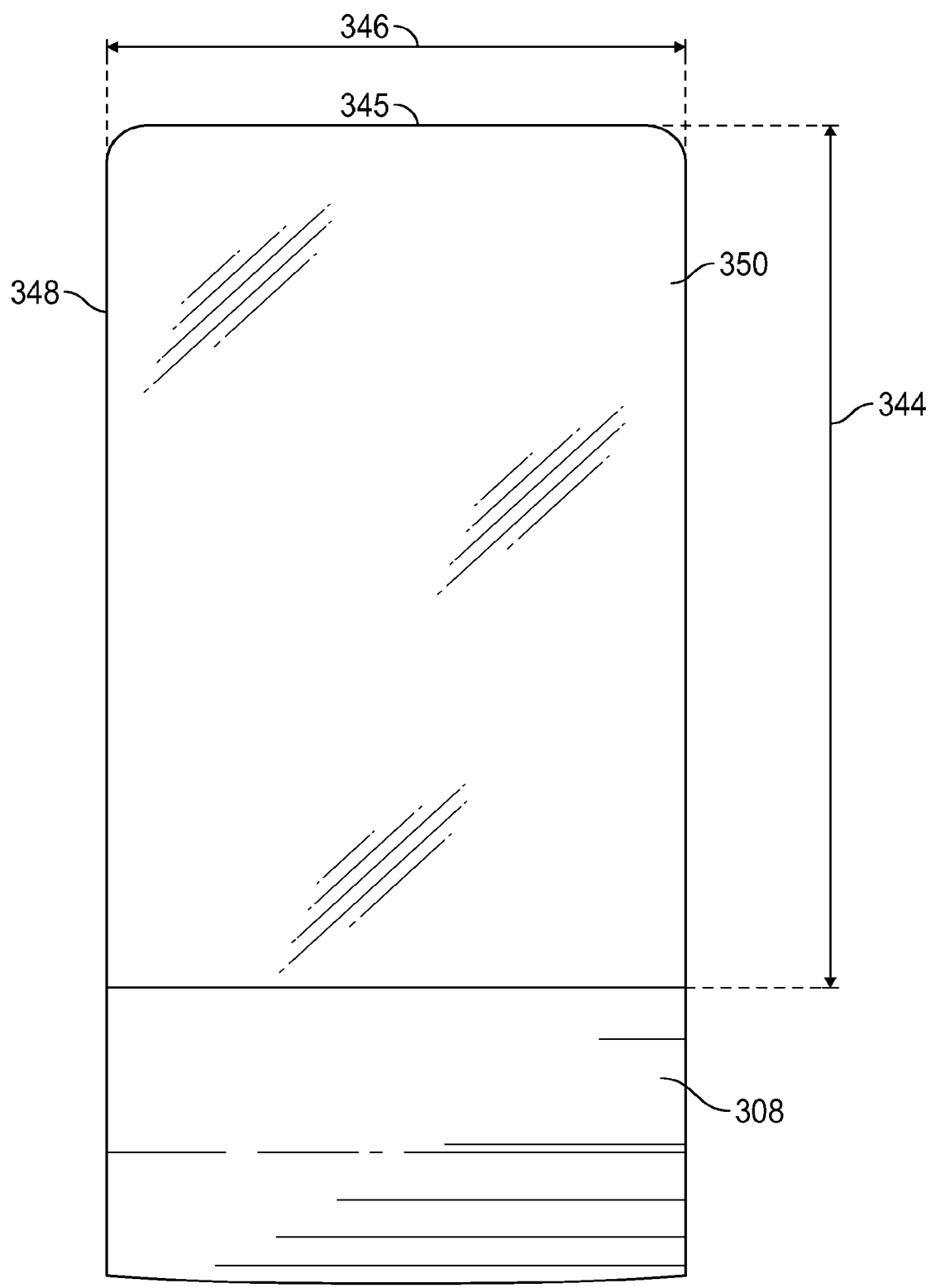
FIG. 27 is a front view of the thermostat of FIG. 26.
Figure 28:
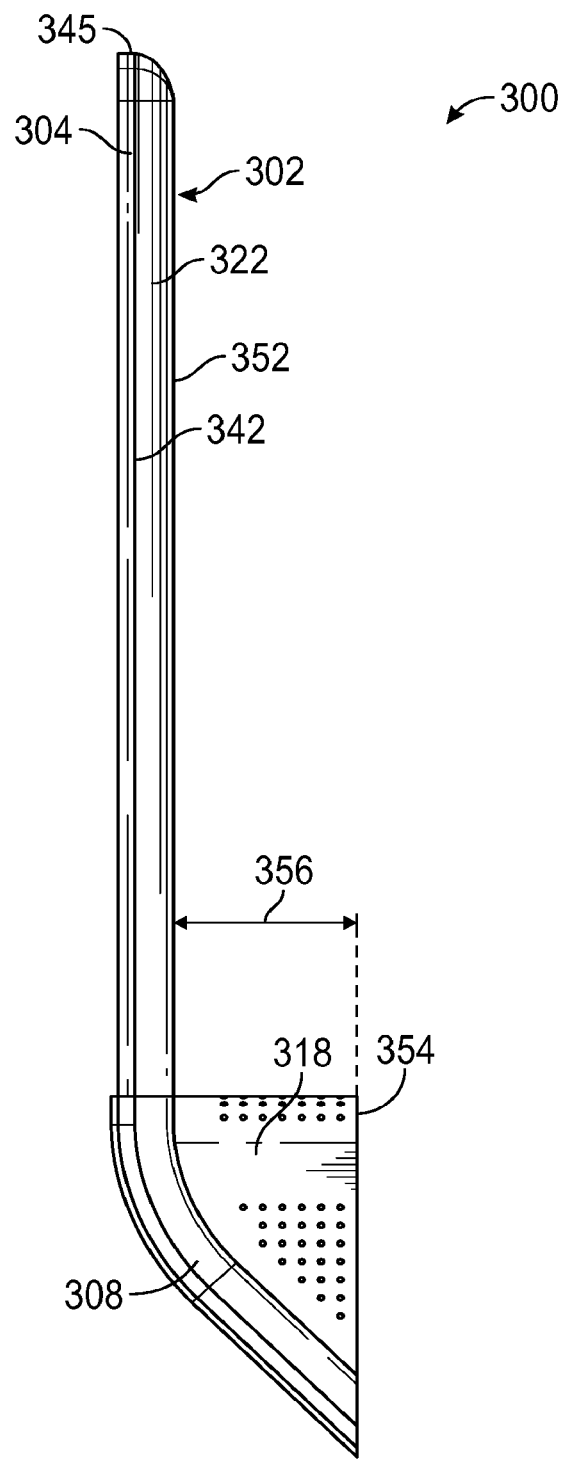
FIG. 28 is a side view of the thermostat of FIG. 26.

The display mount 122 may be configured as a landscape display with the width 146 greater than the height 144 (as shown in FIGS. 1-18), as a portrait display with the width 146 less than the height 144 (as shown in FIGS. 26-28), or as a square display with the width 146 equal to the height 144. The top surface of the top wall 132 and the top side 145 of the display mount 122 are parallel to one another. The left side 148 and the right side 150 are parallel to one another. The mounting surface 142 and the back surface 152 are parallel to one another. The top side 145 is perpendicular to the left side 148 and the right side 150. In some embodiments, the display mount 122 is arranged with the four sides not arranged in a rectangle or square (e.g., a parallelogram, a rhombus, a trapezoid, etc.) in shapes with more or fewer than four sides (e.g., a triangle, a pentagon, a hexagon, etc.), as a circle, as an oval or ellipse, or other shape suitable for mounting a display.

Figure 10:
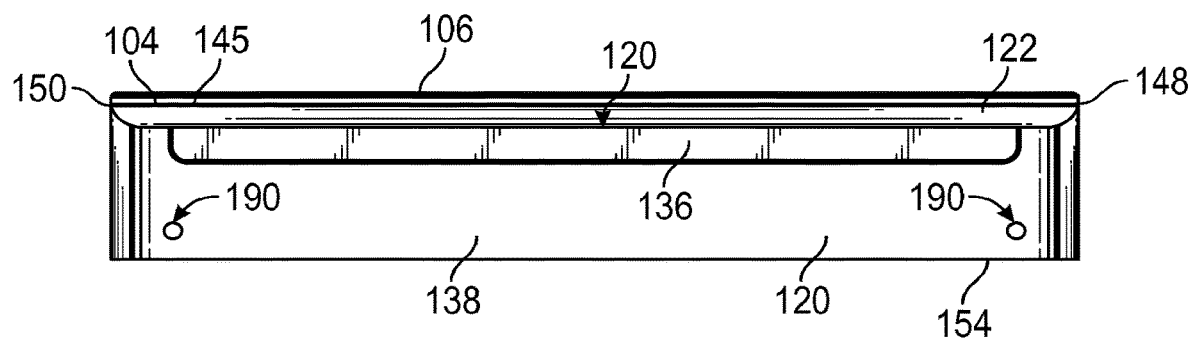
FIG. 10 is a top view of the thermostat of FIG. 1 with a top cover not shown.
Figure 11:
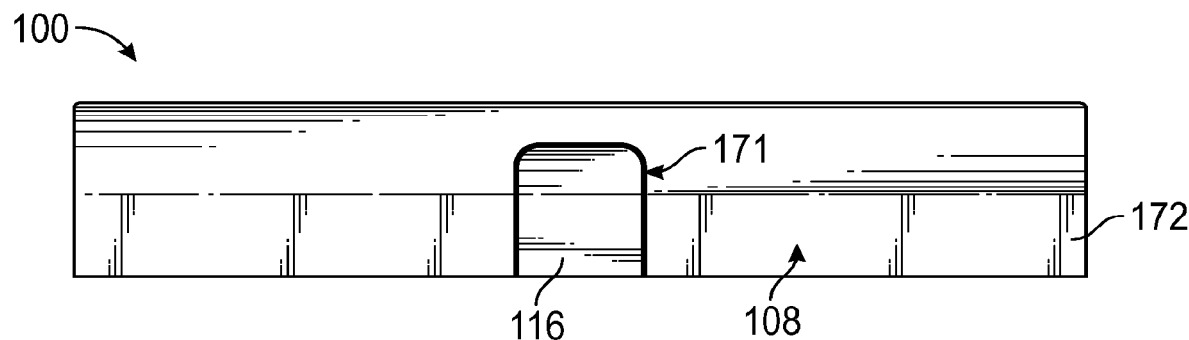
FIG. 11 is a bottom view of the thermostat of FIG. 1.
Figure 13:
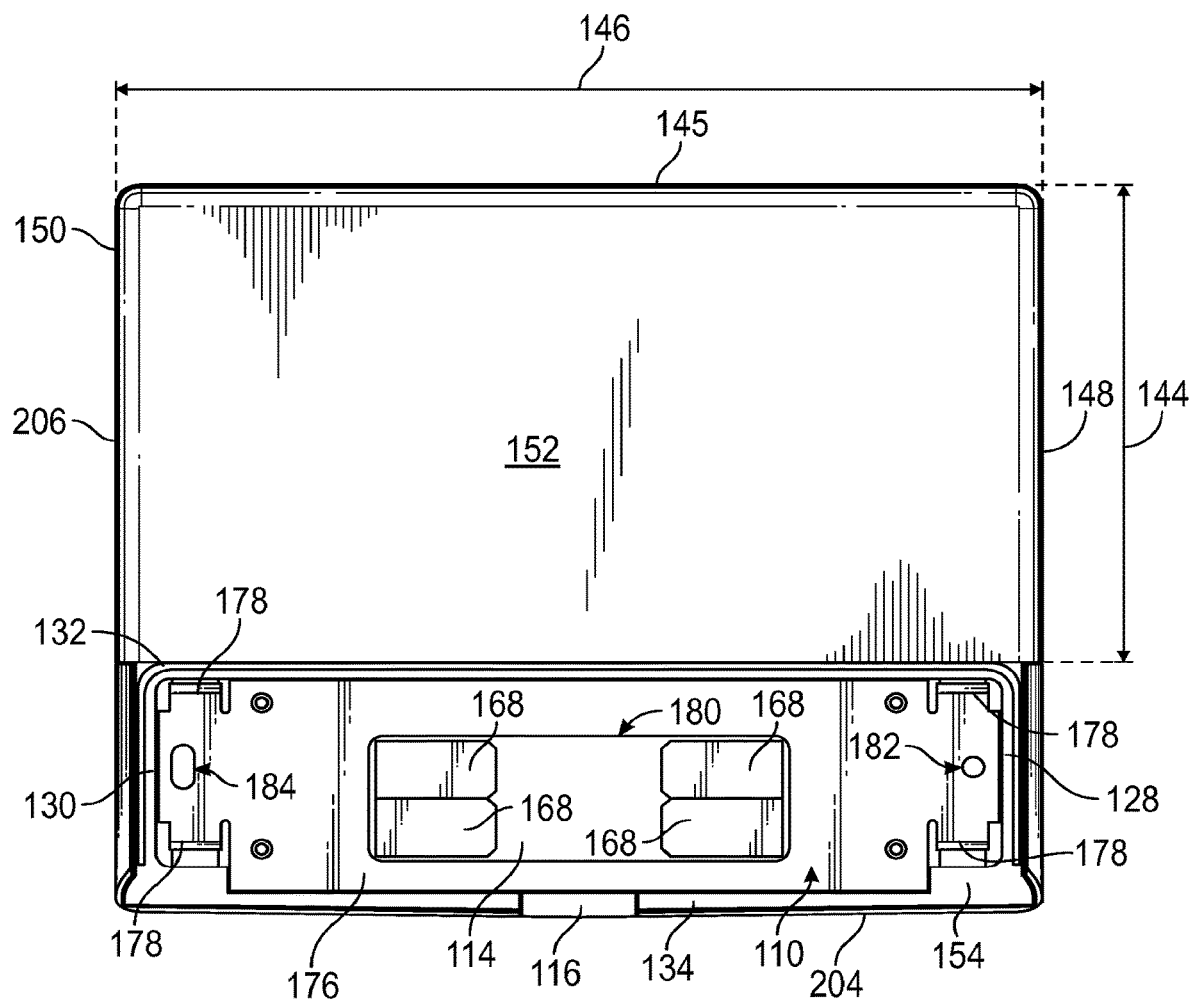
FIG. 13 is a rear view of the thermostat of FIG. 1.

As shown in FIGS. 8, 10, and 13, a rear or back face 154 of the base 120 of the housing 102 is defined by the ends of the top wall 132, the side walls 128 and 130, and the bottom wall 134 located opposite the front wall 126. The rear face 154 is arranged vertically and is planar to facilitate mounting the thermostat body to a vertical wall. As shown in FIG. 8, the back surface 152 of the display mount 122 is spaced apart from the rear face 154 of the base 120 by a horizontal distance 156. As illustrated, the horizontal distance 156 is constant over the height 144 of the display mount so that the back surface 152 of the display mount 122 is parallel to the rear face 154 of the base 120. The mounting surface 142 of the display mount 122 is perpendicular to the top surface of the top wall 132. The back surface 152 of the display mount 122 is perpendicular to the top surface of the top wall 132. In other embodiments the horizontal distance 156 may decrease from the top wall 132 of the base to the top side 145 of the display mount 122 so that the display mount 122 angles toward the wall. In other embodiments the horizontal distance 156 may increase from the top wall 132 of the base to the top side 145 of the display mount 122 so that the display mount 122 angles away from the wall. As illustrated, the display mount 122 is a portion of the front wall 126 (i.e., the portion extending upward from the top surface of the top wall 132) to the freestanding top end 145. In other embodiments, the display mount 122 is a separate structure from the front wall 126. As illustrated, the display mount 122 is positioned at the front of the base 120 so that the mounting surface 142 and the front surface of the front wall 126 are coplanar. In other embodiments, the display mount 122 is positioned between the front of the base 120 and the rear face 154 of the base 120, but is spaced apart from the rear face 154 by the horizontal distance 156 (i.e., the back surface 152 of the display mount 122 is not coplanar with the rear face 154 of the base 120).

As shown in FIG. 8, the touch-sensitive display 104 is attached to the mounting surface 142 of the display mount 122 (e.g., by adhesive or other appropriate fastening techniques). The protective cover 106 is attached to front surface of the display 104 to protect the display 104 from impacts and other damage. The protective cover 106 is transparent so as to not impair the display function of the touch-sensitive display 104. In some embodiments, the protective cover 106 is omitted. In other embodiments, the protective cover is an integral component of the display 104.

As shown in FIGS. 8 and 14, in the illustrated embodiment, the housing 102 is a single integrally formed component that includes both the base 120 and the display mount 122. Forming the housing 102 as a single integral component helps the thermostat 100 withstand the torque applied about the connecting point between the display mount 122 and the base 120 when a user pushes on the touch-sensitive display 104. The relatively large thickness 148 of the display mount 122 also helps withstand this torque.

As shown in FIGS. 8 and 14, the touch-sensitive display 104 may be a touchscreen or other type of electronic display configured to present information to a user in a visual format (e.g., as text, graphics, etc.) and receive input from a user (e.g., via a touch-sensitive panel). For example, the touch-sensitive display 104 may include a touch-sensitive panel layered on top of an electronic visual display. A user can provide inputs through simple or multi-touch gestures by touching the display 104 with one or more fingers and/or with a stylus or pen. The touch-sensitive display 104 can use any of a variety of touch-sensing technologies to receive user inputs, such as capacitive sensing (e.g., surface capacitance, projected capacitance, mutual capacitance, self-capacitance, etc.), resistive sensing, surface acoustic wave, infrared grid, infrared acrylic projection, optical imaging, dispersive signal technology, acoustic pulse recognition, or other touch-sensitive technologies known in the art. Many of these technologies allow for multi-touch responsiveness of display 104 allowing registration of touch in two or even more locations at once. The display may use any of a variety of display technologies such as light emitting diode (LED), organic light-emitting diode (OLED), liquid-crystal display (LCD), organic light-emitting transistor (OLET), surface-conduction electron-emitter display (SED), field emission display (FED), digital light processing (DLP), liquid crystal on silicon (LCoC), or any other display technologies known in the art. In some embodiments, the touch-sensitive display 104 is configured to present visual media (e.g., text, graphics, etc.) without requiring a backlight.

As shown in FIG. 14, the touch-sensitive display 104, the protective cover 106, and the display mount 122 (collectively, the "display assembly") are not opaque, which allows the surface behind display assembly to be seen through the display assembly by a user operating or observing the thermostat 100. In embodiments omitting the protective cover 106 or in which a protective cover is an integral component of the touch-sensitive display 104, the "display assembly" consists of the touch-sensitive display 104 and the display mount 122. Not opaque means that at least some visible light is able to pass through the component and includes transparent and translucent components. For example, when the thermostat 100 is mounted on a wall, the wall is visible through the display assembly. This allows the thermostat to blend in to its surroundings when not in use (e.g. when no visual media is being displayed on the touch screen display). In the illustrated embodiment, the entire housing 102 is not opaque. In other embodiments, only the display mount 122 portion of the housing is not opaque. The housing 102 may be formed from a variety of materials (e.g., polymers including acrylics, metals, composite materials, laminates, etc.)

As shown in FIGS. 8 and 14, the housing 102 may contain various electronic components, including one or more sensors, components configured to perform control functions (e.g., circuit boards, processing circuits, memory, a processor, etc.), components configured to facilitate communications (e.g., a WiFi transceiver, a cellular transceiver, a communications interface, etc.), and components configured to provide a visual display via the touch-sensitive display 104 (e.g., a video card or module, etc.).

The sensors may include a temperature sensor, a humidity sensor, a motion or occupancy sensor (e.g., a passive infrared sensor), an air quality sensor (e.g., carbon monoxide, carbon dioxide, allergens, smoke, etc.), a proximity sensor (e.g., a thermopile to detect the presence of a human and/or NFC, RFID, Bluetooth, sensors to detect the presence of a mobile device, etc.), a camera, a microphone, a light sensor, a vibration sensor, or any other type of sensor configured to measure a variable state or condition of the environment in which the thermostat 100 is installed. In some embodiments, the proximity sensor is used to turn on the display 104 to present visual media when the user is close to the thermostat 100 and turn off the display 104 when the user is not close to the thermostat 100, leading to less power usage and longer display life. Some sensors such as a proximity sensor, a motion sensor, a camera, a light sensor, or an optical sensor may positioned within the housing 102 to monitor the space near the thermostat 100 through the sensor lens 116. The lens 116 is not opaque and allows at least the frequencies of light necessary for the particular sensor to function to pass therethrough, allowing the sensor to "see" or "look" through the lens 116.

In other embodiments, one or more sensors may be located external to the housing 102 and may provide input to the thermostat 100 via a data communications link. For example, one or more sensors may be installed in a gang box behind the thermostat 100, installed in a separate gang box mounted within the same wall to which the thermostat 100 is mounted, or otherwise located throughout the room or space monitored or controlled by the thermostat 100 (e.g., in a wall, in a ceiling panel, in an open volume of the room or space, in a duct providing airflow to the room or space or receiving airflow from the room or space, etc.). This allows the thermostat 100 to monitor the input from a variety of sensors positioned at disparate locations. For example, a humidity sensor may be positioned in a wall and configured to measure the humidity within the wall (e.g., to detect water leakage or burst pipes).

Figure 7:
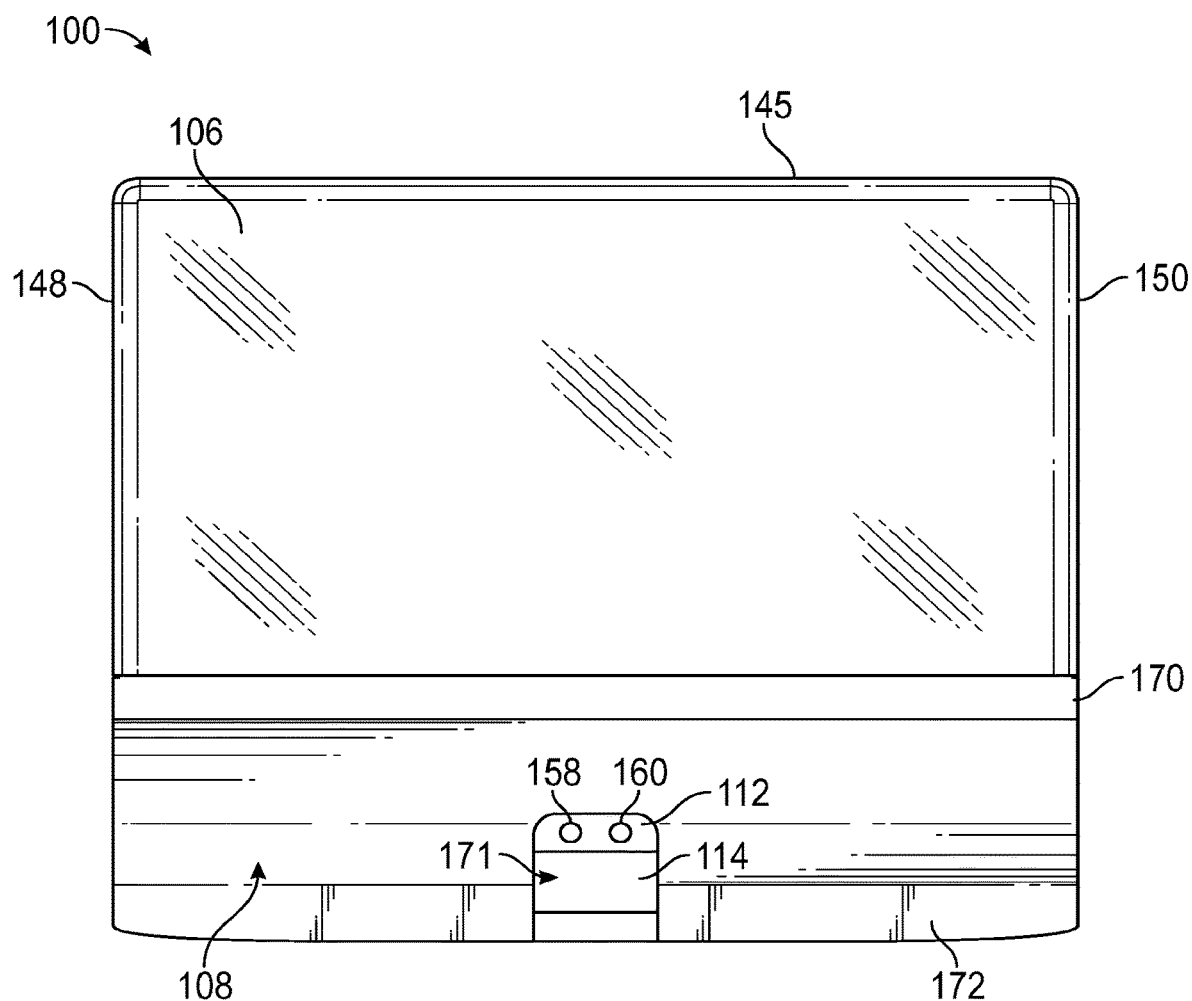
FIG. 7 is a front view of the thermostat of FIG. 1 with a sensor lens not shown.

As shown in FIGS. 5, 7, and 8, the circuit boards 112 and 114 may include one or more sensors (e.g., a temperature sensor, a humidity sensor, etc.), communications electronics, a processing circuit, and/or other electronics configured to facilitate the functions of the thermostat 100. As shown in FIG. 8, the circuit boards 112 and 114 are oriented substantially parallel to the display mount 122 and the rear face 154 of the base 120. The circuit boards 112 and 114 may be spaced apart from one another in a direction perpendicular to the display mount 122 and the rear face 154. In other embodiments, one or both of the circuit boards 112 and 114 may be oriented substantially perpendicular to the display mount 122 and the rear face 154.

In some embodiments, the circuit board 112 functions at least in part as a sensor board and has one or more sensors, including a proximity sensor 158, a motion or occupancy sensor 160, and a temperature sensor 162. In some embodiments, the circuit board 114 functions at least in part as control board and includes processing electronics 164, a power supply or battery 166, and input terminals 168 for receiving wiring from the HVAC system to be controlled by the thermostat. The processing electronics 164 are coupled (e.g., by a cable or wiring harness) to the touch-sensitive display 104 to receive user inputs from the display 104 and provide outputs to control the display 104 to control operation of the display 104. In some embodiments, the power supply 166 is rechargeable. In some embodiments, the power supply 166 can be replaced by the user. The processing electronics can include a processor and memory device. Processor can be implemented as a general purpose processor, an application specific integrated circuit (ASIC), one or more field programmable gate arrays (FPGAs), a group of processing components, or other suitable electronic processing components. Memory device (e.g., memory, memory unit, storage device, etc.) is one or more devices (e.g., RAM, ROM, Flash memory, hard disk storage, etc.) for storing data and/or computer code for completing or facilitating the various processes, layers and modules described in the present application. Memory device may be or include volatile memory or non-volatile memory. Memory device may include database components, object code components, script components, or any other type of information structure for supporting the various activities and information structures described in the present application. According to an exemplary embodiment, memory device is communicably connected to processor via processing circuit and includes computer code for executing (e.g., by processing circuit and/or processor) one or more processes described herein. In some embodiments, the electronic components are found on a single circuit board, are variously distributed among the two circuit boards 112 and 114, or are variously distributed among more than two circuit boards.

As shown in FIGS. 1, 2, 6, and 14, the front cover 108 covers the portion of the front wall 126 located below the display mount 122, the bottom wall 134, and portions of the two side walls 128 and 130 of the housing 102. The front cover 108 may be formed from a variety of materials (e.g., polymers including acrylics, metals, composite materials, laminates, etc.). The front cover 108 includes a front wall 170 and a bottom wall 172 that correspond to or match the front wall 126 and the bottom wall 134 of the housing 102. In the illustrated embodiment, the front cover 108 is removably attached to the housing 102 (e.g., by magnets, by a snap-fit connection, by screws or other mechanical fasteners). Removably attaching the front cover 108 allows the end-user to customize the appearance of the thermostat 100 by allowing him to select amongst front covers made of different materials or having different color or finishes. In some embodiments, the front cover 108 is attached to the housing 102 by a hinge. In some embodiments, the front cover 108 is omitted and the aperture for the sensor lens is formed in the housing. As shown in FIG. 8, the front cover 108 and the protective cover 106 combine to form a continuous or flush front surface of the thermostat 100.

Figure 6:
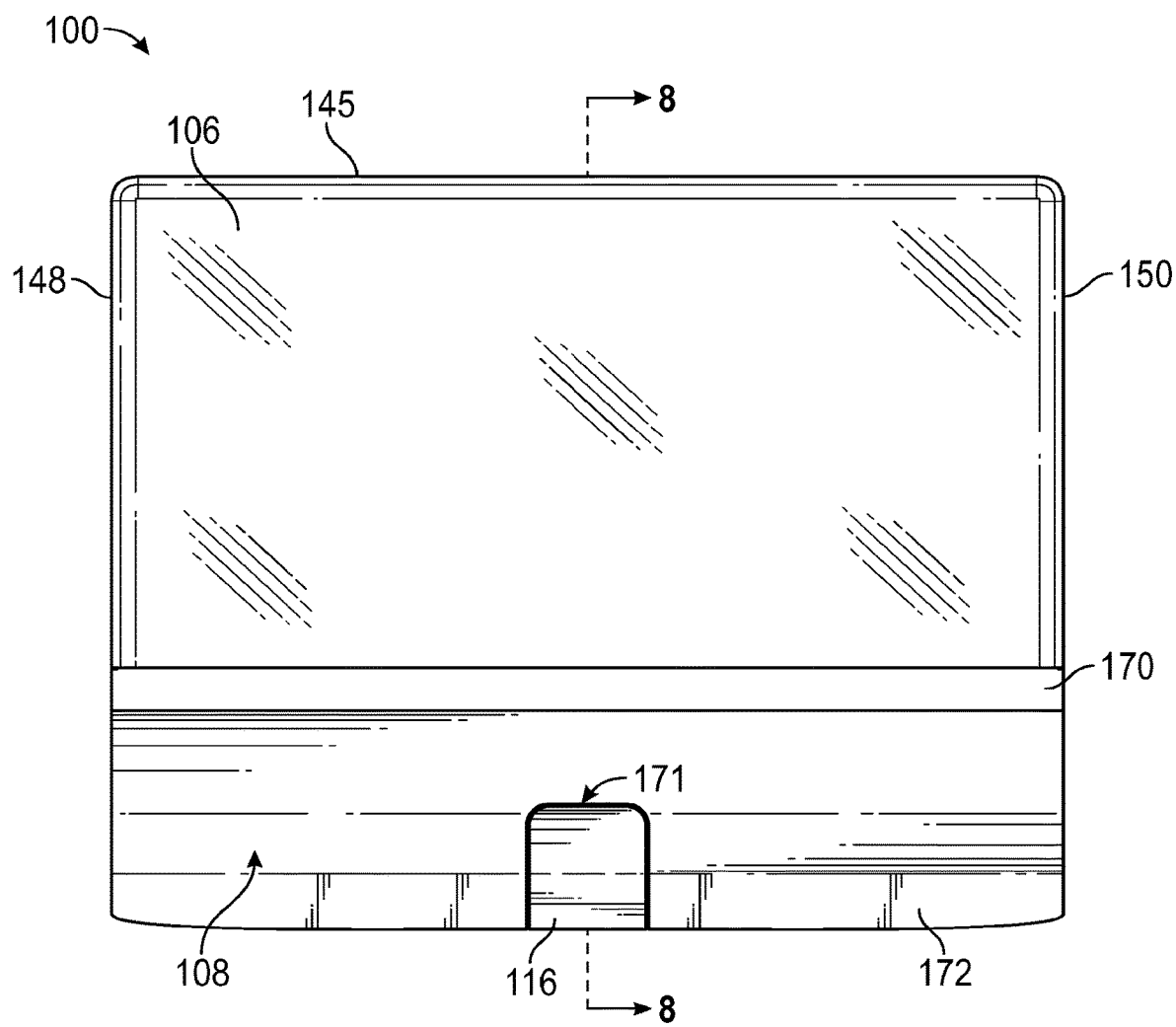
FIG. 6 is a front view of the thermostat of FIG. 1.

As shown in FIGS. 6-8, the sensor lens 116 is positioned within an aperture or opening 171 formed through the bottom wall 134 of the front cover 108 and through the bottom wall 134 of the base 120 of the housing 102. As illustrated, the aperture 171 is three-sided with the open side located at the rear face 154 of the housing 102. This positions the lens 116 and the aperture 171 near the lower end of the front cover 108 and near the lower end of the housing 102. In some embodiments, the lens 116 and the aperture 171 are positioned near the upper end of the front cover 108 and near the upper end of the housing 102 (e.g., near the display assembly). The lens 116 may be secured in the aperture 171 by a friction or snap fit, adhesive, or other appropriate fastening technique. In some embodiments, the thermostat 100 includes multiple sensor lenses located in corresponding apertures in the front cover 108 or in corresponding apertures in the housing 102 or the top cover 118.

As shown in FIG. 14, the top cover 118 is removably attached to the housing 102. The top cover 118 include a top wall 119 and two side walls 121 and 123 that are cantilevered downward form the top wall 119. The top wall 119 of the top cover 118 covers a portion of the top wall 132 of the base 120 and the two side walls 121 and 123 of the top cover 118 cover portions of the two side walls 128 and 130 of the base 120. The top cover 118 includes multiple apertures or openings 174 that allow increased air flow to the housing 102, which may aid in cooling the electronic components located within the housing 102. In the illustrated embodiment, the apertures 174 are a series of relatively small circular perforations. In other embodiments, the apertures 174 may be larger, different shapes, and/or formed as slots or louvers. The top cover 118 may be formed from a variety of materials (e.g., polymers including acrylics, metals, composite materials, laminates, etc.). In the illustrated embodiment, the top cover 118 is removably attached to the housing 102 (e.g., by magnets, by a snap-fit connection, by screws or other mechanical fasteners). Removably attaching the top cover 118 allows the end-user to customize the appearance of the thermostat 100 by allowing him to select amongst top covers made of different materials or having different color or finishes. In some embodiments, the top cover 118 is attached to the housing 102 by a hinge. In some embodiments, the top cover 118 is omitted from the thermostat 100.

Figure 4:
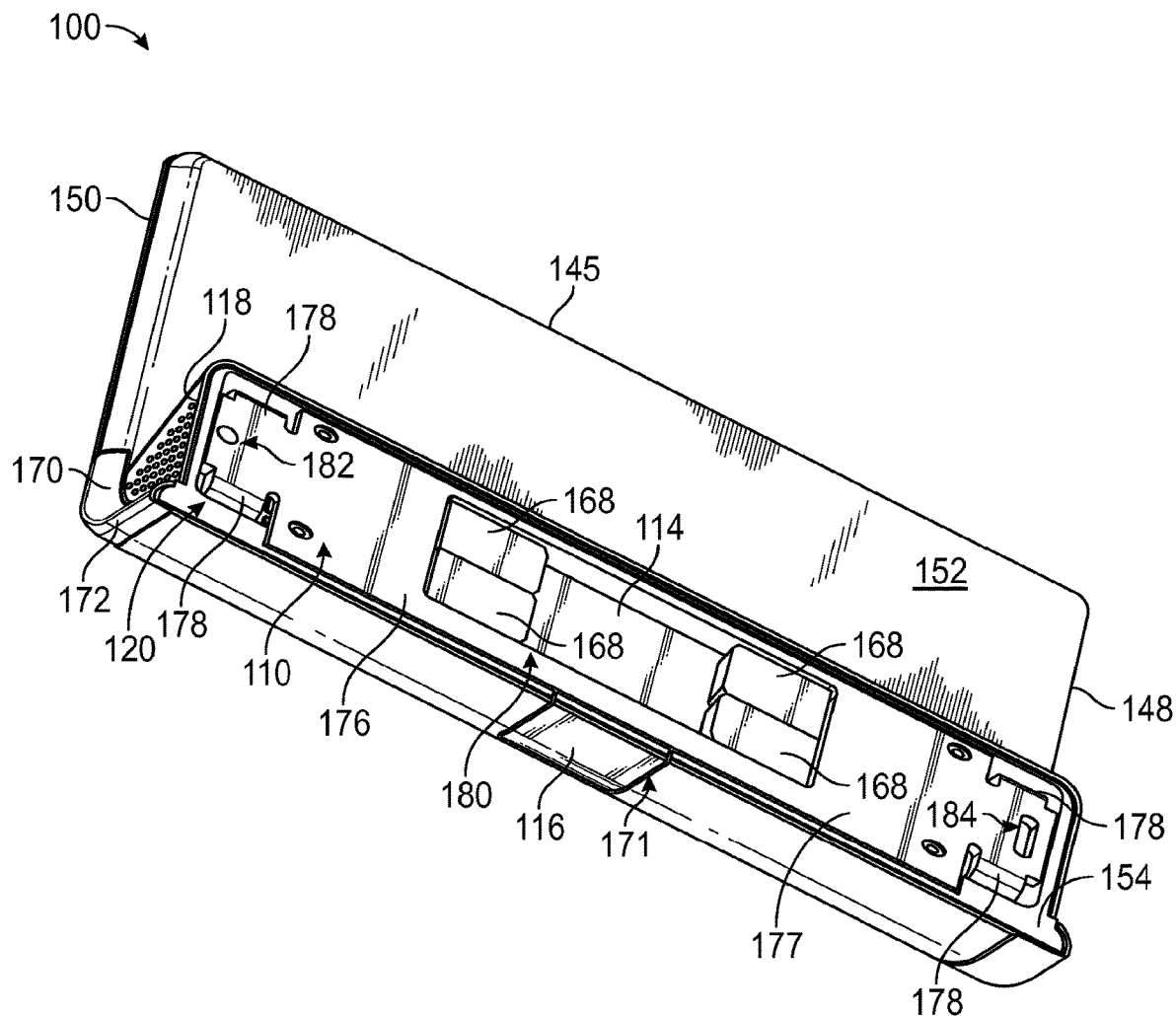
FIG. 4 is a rear perspective view from below of the thermostat of FIG. 1.
Figure 15:
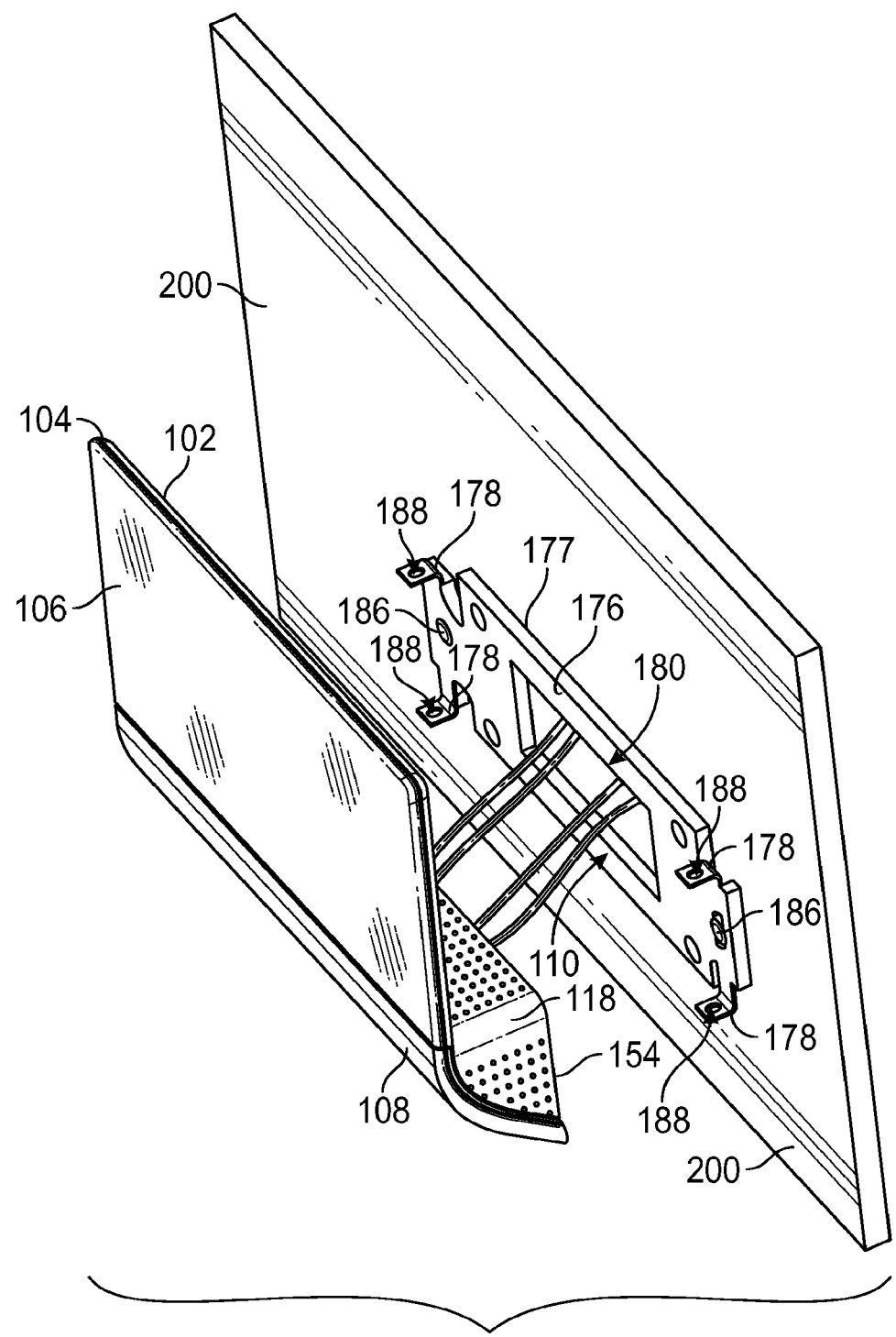
FIG. 15 is a perspective view of the thermostat of FIG. 1 with a thermostat body shown separate from a mounting plate attached to a wall.

As shown in FIGS. 4, 8, 14, and 15 the mounting plate 110 includes a main portion or base 176 and four attachment tabs 178 that extend perpendicularly away from the base 176. As shown in FIGS. 4 and 15, the mounting plate 110 includes a rear surface 177 that is configured to placed flush against the wall 200 or other surface that thermostat 100 is to be mounted to. The base 176 includes an aperture or opening 180 that is and configured to allow control wiring from the HVAC system to be controlled by the thermostat 100 to pass through the mounting plate 110 and to be connected to the input terminals 168 located within the housing 102. As illustrated, the aperture 180 is centrally located in the base 176. Two fastener apertures or openings 182 and 184 are formed through the base 176 and are spaced apart from one another. Each aperture 182 and 184 allows a screw 186 or other mechanical fastener to pass through the base 176 to attach the mounting plate 110 to a wall or other mounting location. As illustrated, the aperture 182 is circular and the aperture 184 is an elongated slot. The elongated slot allows the user to pivot the mounting plate 110 relative to the mounting holes in the wall to level the mounting plate 110 horizontally before tightening the fasteners to fix the mounting plate 110 in place on the wall. In some embodiments the apertures 182 and 184 are spaced apart by a standard thermostat mounting distance so that the thermostat 100 can be used to replace an existing thermostat without having to drill new mounting holes into the wall that the thermostat 100 is being attached to.

Figure 16:
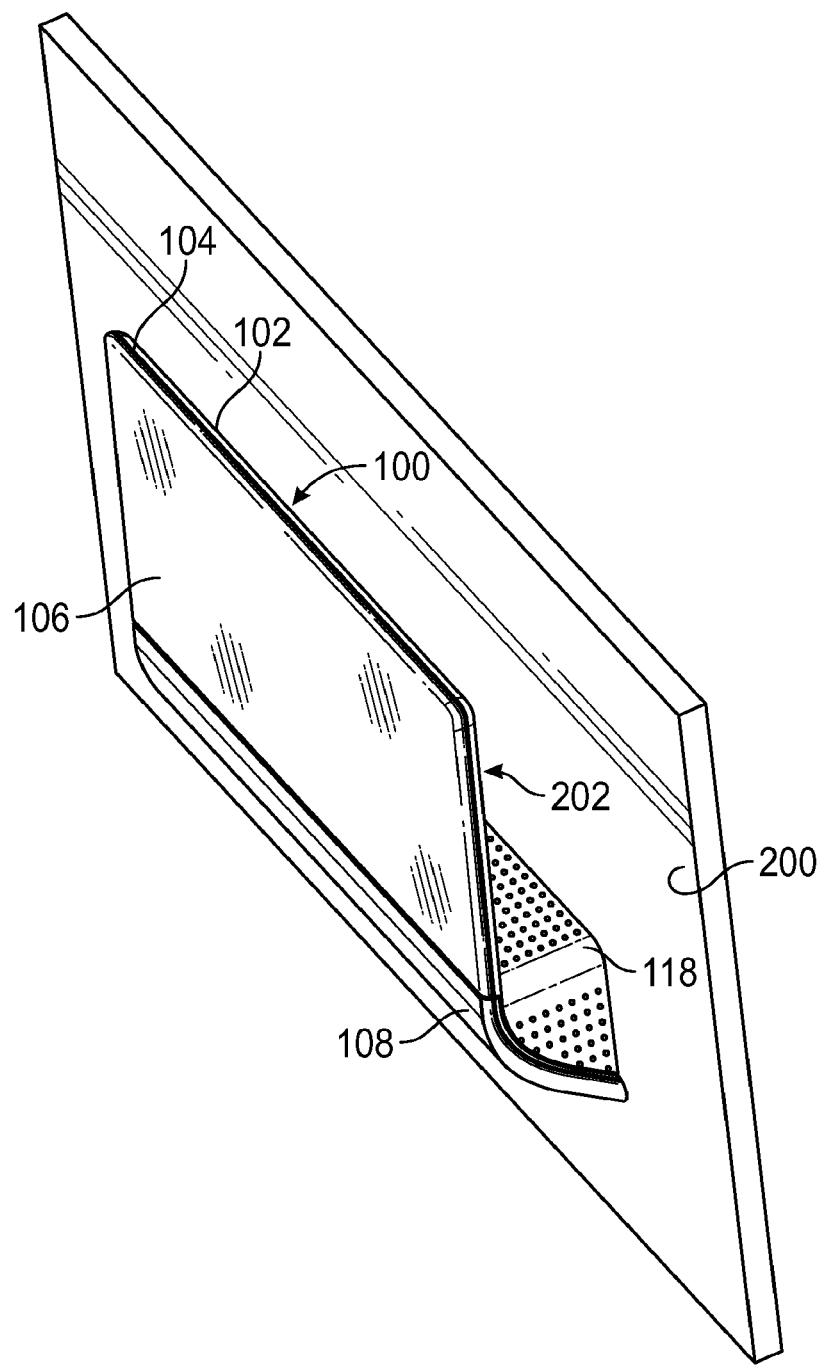
FIG. 16 is a perspective view of the thermostat of FIG. 1 attached to a wall.

As shown in FIGS. 4, 14, and 15 the attachment tabs 178 are arranged to extend into the volume 124 within the base 120 of the housing 102. Each tab 178 includes an aperture or opening 188 for receiving a screw or other fastener to attach the housing 102 to the mounting plate 110. As shown in FIG. 5, the housing 102 includes corresponding apertures or openings 190 formed in the top wall 132 and the bottom wall 134 to allow the fastener to extend through the housing 102 to the attachment tab. One or both of each pair of apertures 188 and 190 may be threaded for use with a threaded fastener. After the mounting plate 110 is attached to the wall and the wires are connected to the wire terminals 168 (as shown in FIG. 15), the thermostat body is positioned on the mounting plate 110 and the housing 102 is attached to the mounting plate 110 (as shown in FIG. 16). The apertures 190 in the top wall 132 are covered by the top cover 118 and the apertures 190 in the bottom wall 134 are covered by the front cover 108. In some embodiments, the attachment tabs 178 are replaced by snap-fit connections, spring-biased arms, or other attachment structures suitable for attaching the housing 102 to the mounting plate 110. As shown in FIG. 8, when the housing 102 is attached to the mounting plate 110, the mounting plate 110 is positioned within the volume 124 formed in the interior of the housing 102 with the rear surface 177 of the mounting plate 176 flush with the rear face 154 of the base 120 of the housing 102. This covers the mounting plate 110 from view by an observer or user of the thermostat 100.

Figure 17:
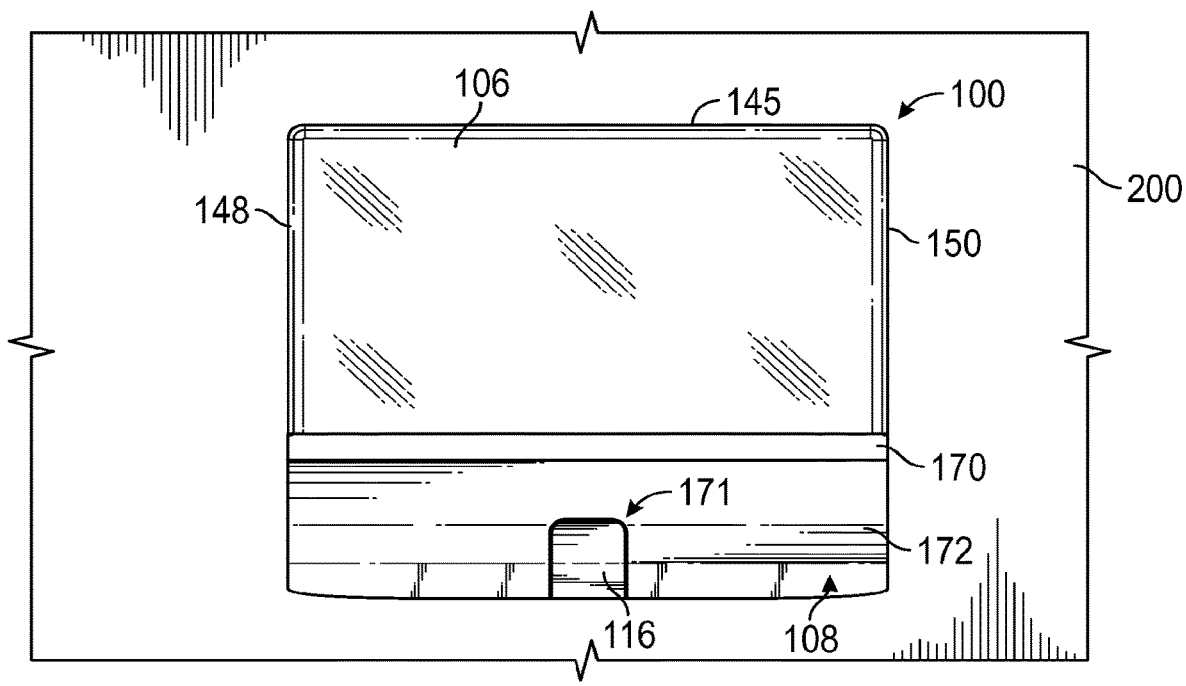
FIG. 17 is a front view of the thermostat of FIG. 1 attached to a wall.
Figure 18:
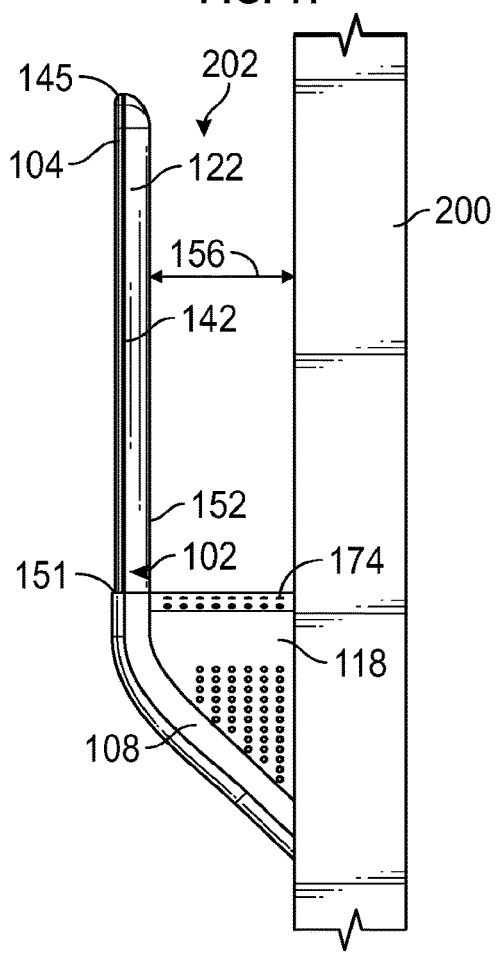
FIG. 18 is a side view of the thermostat of FIG. 1 attached to a wall.

As shown in FIGS. 17-18, the thermostat 100 is attached to a wall 200. The display assembly (e.g., the touch-sensitive display 104, the protective cover 106, and the display mount 122) are not opaque, which allows a user or observer to see the wall 200 through the display assembly. When no visual media is being displayed on the touch-sensitive display 104, the display assembly may blend in to its surroundings, reducing its visual impact on the wall 200 and the space surrounding the wall 200. For example, an observer sees the color of a painted wall 200 through the display assembly with only the opaque components of the thermostat 100 (e.g., the front cover 108 and the top cover 118) obscuring or covering the observer's view of the wall 200. This has less of a visual impact in terms of opaque components covering the wall, than a conventional thermostat where the entirety of the thermostat is opaque. The visual impact can further be reduced by matching the color of the front cover 108 and the top cover 118 to the color of the wall.

As shown in FIGS. 16 and 18, the display assembly is spaced apart from the wall 200 with the back surface 152 of the display mount 122 spaced apart from the wall 200 by the horizontal distance 156, leaving a gap 202 between the display mount 122 and the wall 200. In conventional thermostats there is no gap between the display assembly and the wall like the gap 202 which is filled with the ambient atmosphere found near the thermostat 100. Conventional thermostats are flush mounted with the wall so that the total perimeter or substantially the total perimeter of the thermostat is in contact with the wall or a mounting plate having a total perimeter the same or larger than the total perimeter of the thermostat is in contact with the wall. In contrast as shown in FIG. 13 for the thermostat 100, the perimeter 204 of the rear face 154 of the base 120 of the housing 102 that is in contact with the wall 200 is much less than total perimeter 206 of the housing 102 (i.e., the combined perimeter of the back surface 152 of the display mount 122 and the perimeter 204 of the rear face 154 of the base 120). The gap 202 and the reduced perimeter 204 contacting the wall 200 each help the temperature sensor 162 of the thermostat read conditions as close to the ambient conditions of the room as possible by separating the temperature sensor from wall 200, which can frequently be at a lower temperature than ambient conditions in the room. The gap 202 and the reduced perimeter 204 contacting the wall 200 also help to improve airflow around the touch-sensitive display 104, thereby dissipating heat that would be transferred to the housing and other components of a conventional thermostat.

Figure 19:
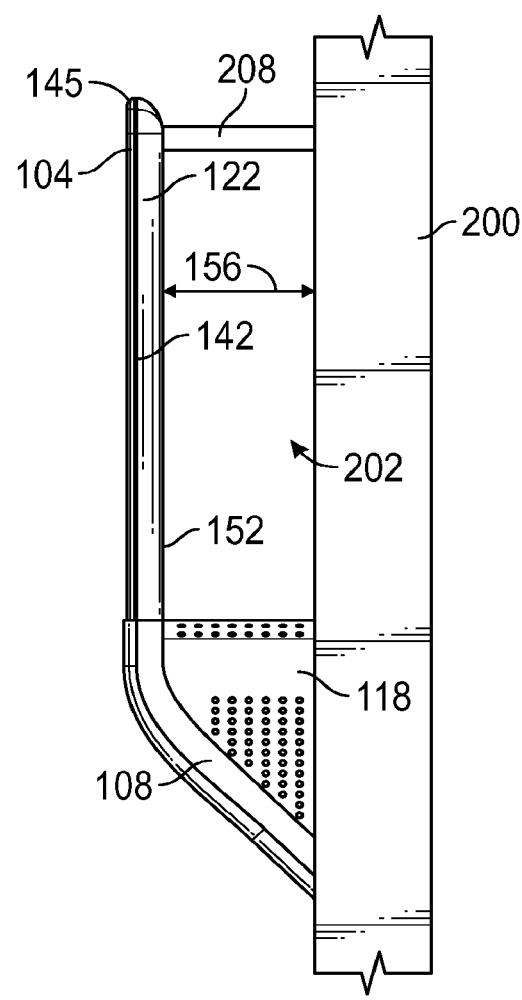
FIG. 19 is a side view of a thermostat according to an exemplary embodiment, with the thermostat attached to the wall.
Figure 20:
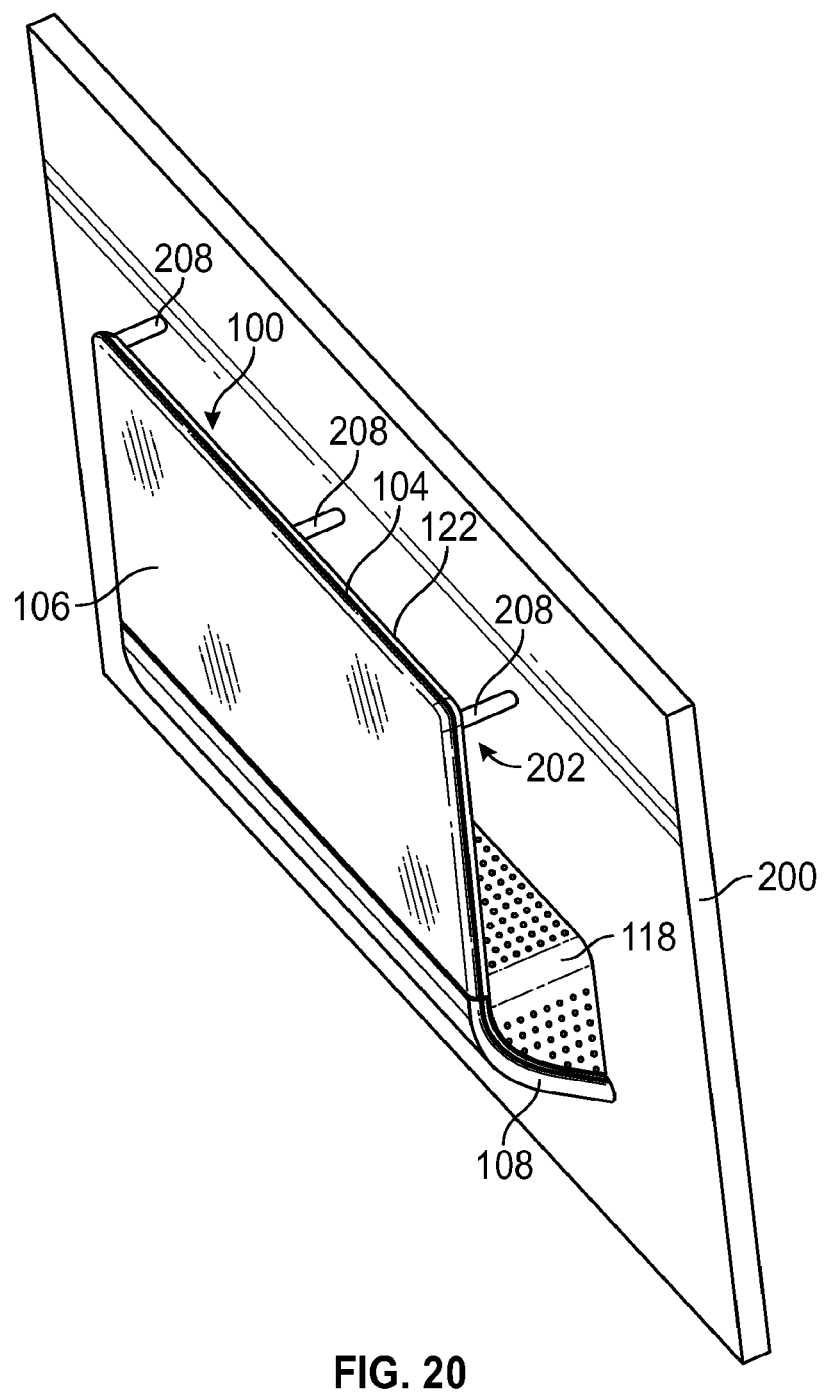
FIG. 20 is a front perspective view from above of the thermostat of FIG. 19.

Referring to FIGS. 19-20, an alternative exemplary embodiment of the thermostat 100 is illustrated. Standoffs or projections 208 extend outward from the back surface 152 of the display mount and are configured to contact the wall that the thermostat 100 is mounted to. The standoffs 208 may be part of a single integrally formed housing 102 or may be separate components attached to the display mount (e.g., by adhesive, mechanical fasteners, heat staking or other appropriate attachment technique). The standoffs 208 help to withstand the torque applied about the connecting point between the display mount 122 and the base 120 when a user pushes on the touch-sensitive display 104. In the illustrated embodiments, three standoffs 208 are provided. In other embodiments, more or fewer standoffs are provided.

Figure 21:
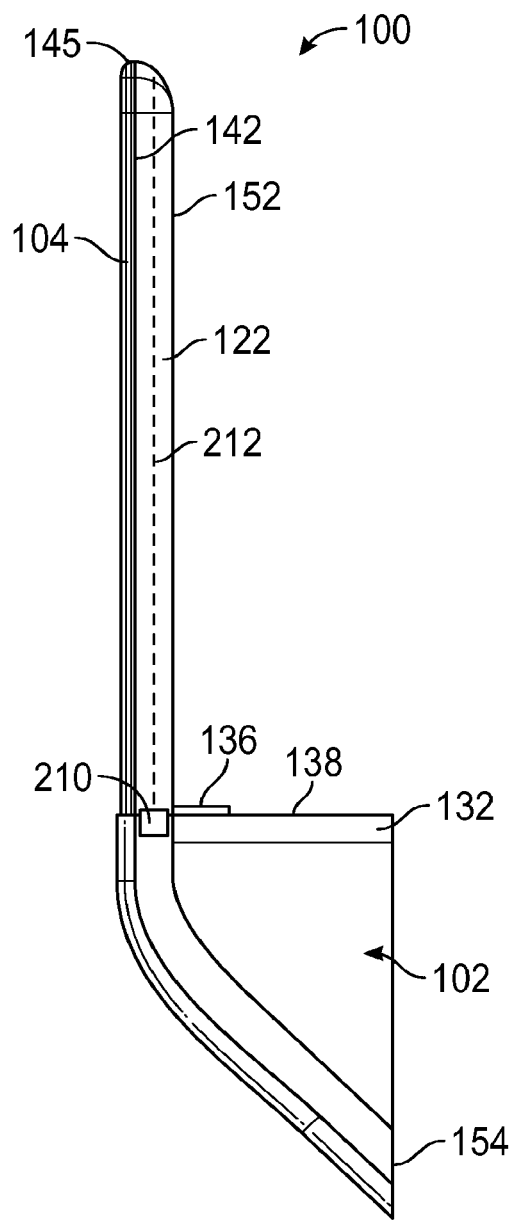
FIG. 21 is a side view of a thermostat according to an exemplary embodiment.
Figure 22:
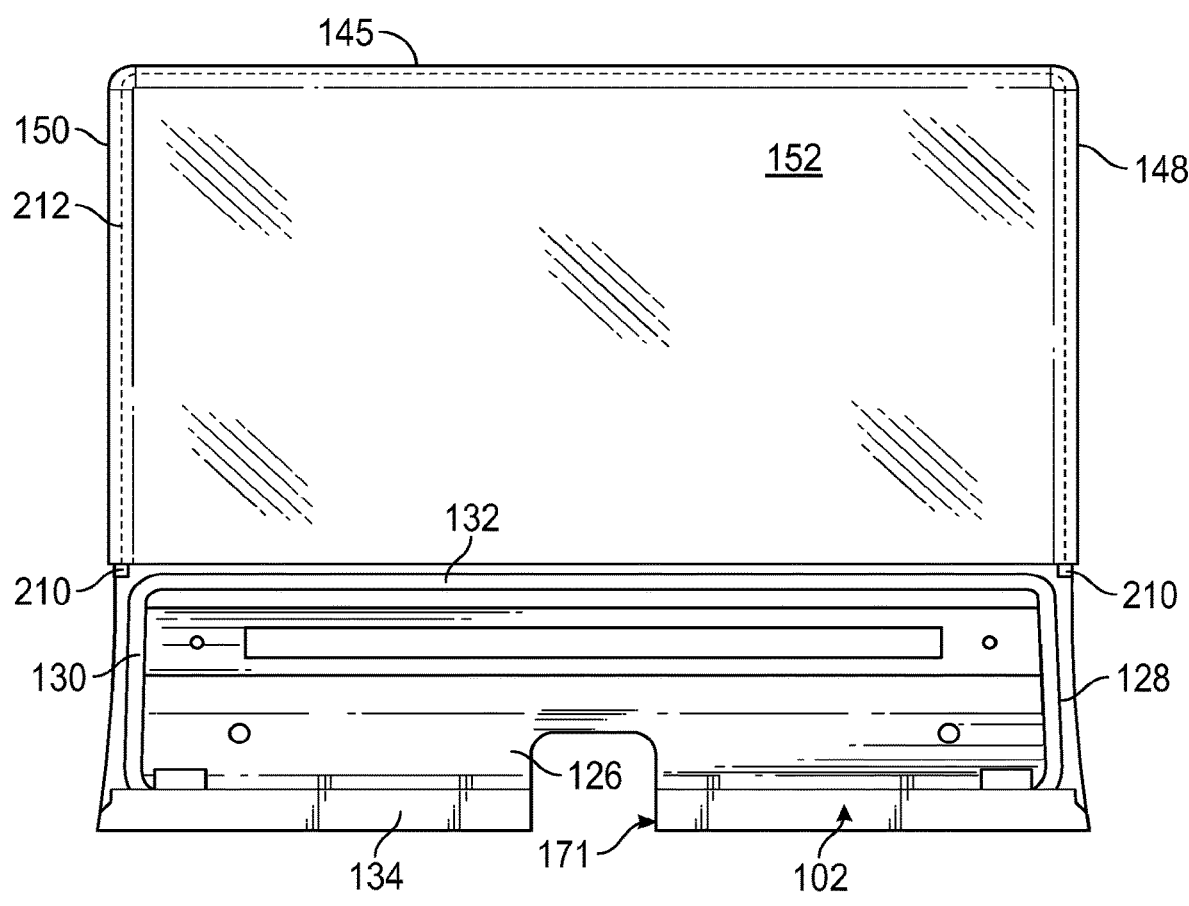
FIG. 22 is a rear view of a housing of the thermostat of FIG. 21.
Figure 23:
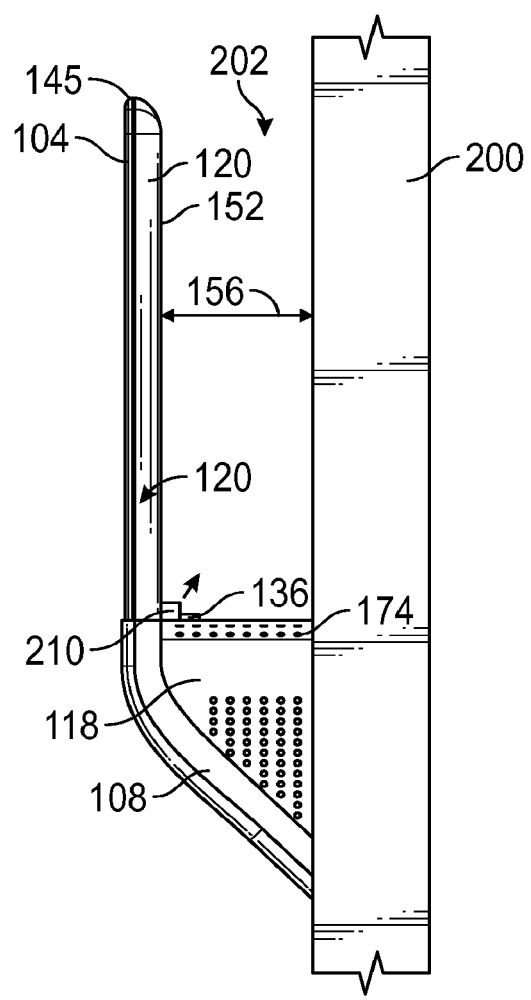
FIG. 23 is a side view of a thermostat according to an exemplary embodiment, with the thermostat attached to the wall.
Figure 24:
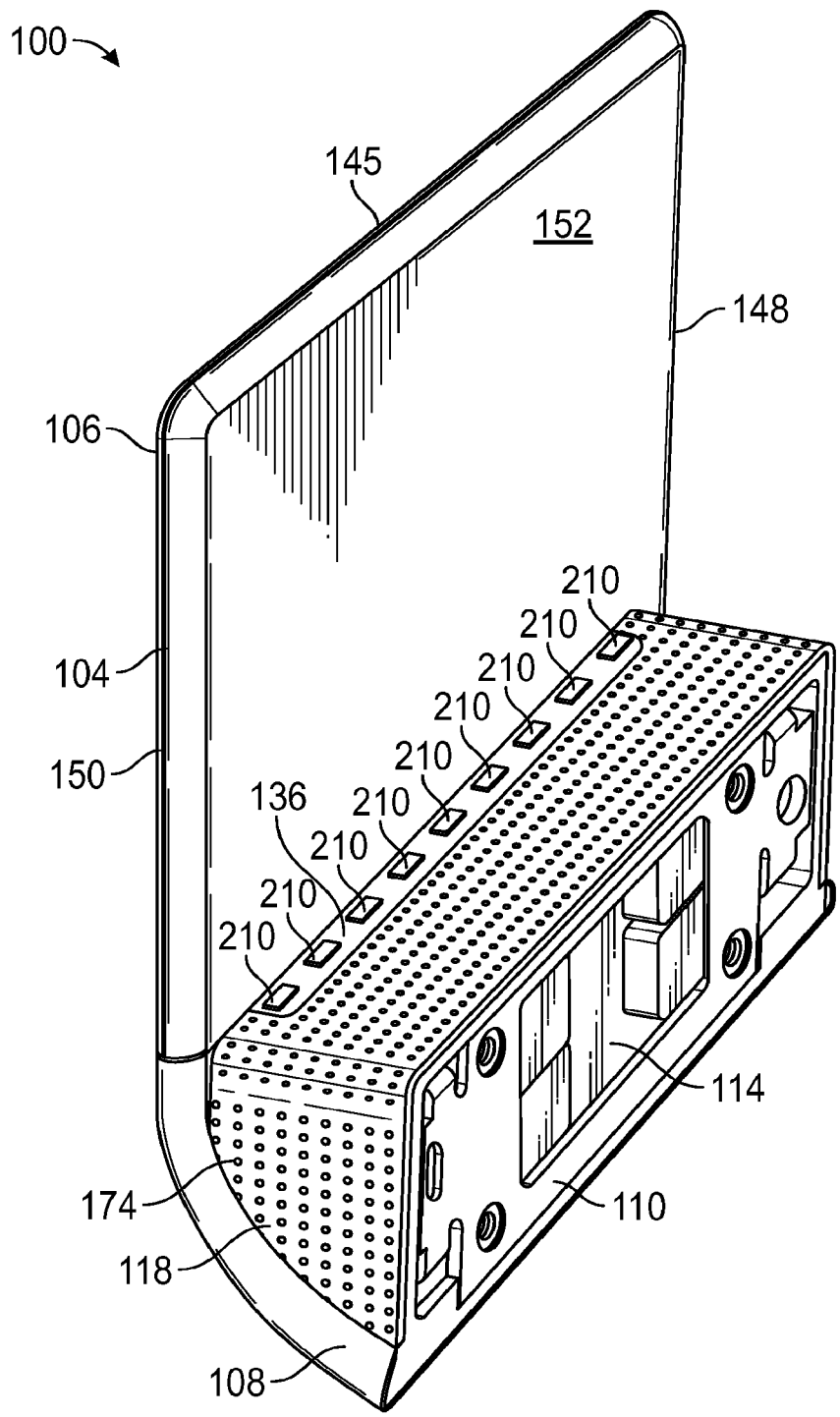
FIG. 24 is a rear perspective view from above of the thermostat of FIG. 23.

Referring to FIGS. 21-24, the thermostat 100 may include one or more light sources 210 (e.g., light emitting diodes) configured to provide ambient lighting and/or other lighting effects associated with the thermostat 100. FIGS. 21-22 illustrate an exemplary embodiment of the thermostat 100 with a display mount 122 that includes a waveguide 212 to direct light from the light sources 210 within the display mount 122. As illustrated, the waveguide 212 forms a frame around three sides of the display mount 122 (the top, left, and right sides). The waveguide 212 may include one or more optical fibers located within or attached to the display mount 122. FIGS. 23-24 illustrate an exemplary embodiment of the thermostat 100 with multiple light sources 210 provided in the section 136 of the top wall 132 of the base 120 of the housing 102. In some embodiments, the light sources 210, with the waveguide 212 or without the wave guide (FIG. 23), are configured to emit light toward the wall or other surface that the thermostat 100 is mounted to. When white light is directed toward the wall, the display assembly (e.g., the touch-sensitive display 104, the protective cover 106, and the display mount 122) appears to be more transparent to the user, further helping the display assembly blend in to its background. The light sources 210 may also be controlled to provide notices or alerts to a user (e.g., yellow for alerts or warnings, red for emergencies, etc.). Steady or flashing light may also provide different notices or alerts to a user (e.g., flashing light indicating an alert that has not been acknowledged by the user and solid light to indicate an alert that has been acknowledged by the user. The light sources 210 may be controllable by the user (e.g., the color, brightness, or other characteristics of light) to provide user-desired mood or ambient lighting.

Figure 25:
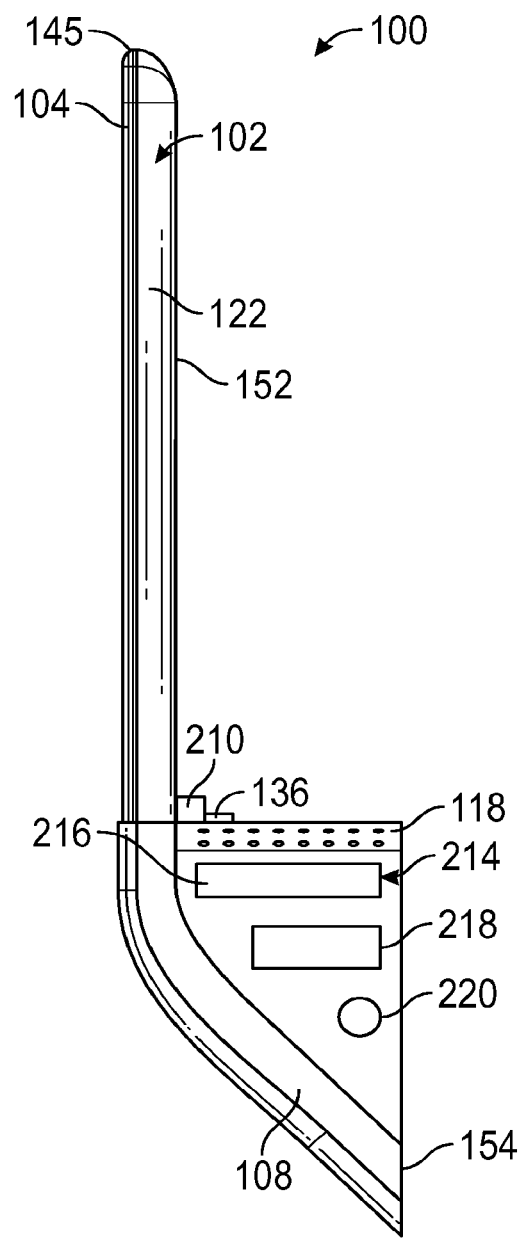
FIG. 25 is a side view of a thermostat according to an exemplary embodiment.

FIG. 25 illustrates an exemplary embodiment of the thermostat 100 having the ability to receive a variety of interchangeable modules or components. The housing 102 includes an aperture or opening 214 for receiving a module 216, which electrically connects to one of the circuit boards 112 and 114 or other electronic component to provide additional functionality to the thermostat 100. The various modules 216 allow the user to upgrade or customize the thermostat 100 to include features of the user's choosing. For example, the thermostat 100 may include any of the features of the modular thermostat described in U.S. Provisional Patent Application No. 62/260,141 filed Nov. 25, 2015, and any of the features of the thermostat described in U.S. Provisional Patent Application No. 62/275,199, filed Jan. 5, 2016, the entireties of each of which are incorporated by reference herein. The modules 216 may include communication transceivers (e.g., ZIGBEE, ZWAVE, near field communication, cellular, etc.), additional sensors, an additional power supply, or other electronic components. In some embodiments, the thermostat 100 provides for the use of more than one module 216 and includes the corresponding apertures 214 in the housing 102. A wired port 218 (e.g., a USB port) may be provided to allow external wired communication and or power supply to and from the electronic components of the thermostat 100. An aperture 220 may be provided to allow access to a reset button located within the housing to allow a user to insert a device (e.g., pen, paperclip, etc.) to manually power down and restart the thermostat 100.

FIGS. 26-28 illustrate a multi-function user control device or thermostat 300, according to an exemplary embodiment. The thermostat 300 is substantially similar to the thermostat 300. Components similar to those of the thermostat 100 are numbered in the 300s instead of the 100s. The thermostat 300 includes a portrait display assembly in which the touch-sensitive display 302, the display mount 322, and the protective cover 306 (if included separate from the display 302) have a height 344 greater than the width 346.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure. References herein to the positions of elements (e.g., "top," "bottom," "above," "below," "upward," "downward," etc.) are used to describe the orientation of various elements relative to one another with the user control device in its normal operating position as illustrated in the drawings.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A thermostat, comprising:
 a housing, comprising:
  a base including a top wall, a bottom wall, a front wall connecting the top wall to the bottom wall, a first side wall connecting the top wall to the bottom wall, and a second side wall connecting the top wall to the bottom wall, wherein the top wall, the bottom wall, the first side wall, and the second side wall define an internal volume; and
  a display mount cantilevered away from the base, the display mount including a mounting surface;
 a touch-sensitive display configured to display visual media and receive user inputs, wherein the touch-sensitive display is attached to the mounting surface of the display mount, and wherein the touch-sensitive display does not overlap the base when viewed from the front of the thermostat; and
 processing electronics positioned within the interior volume of the base, wherein the processing electronics are configured to operate the touch-sensitive display.

2. The thermostat of claim 1, wherein the display mount and the touch-sensitive display are not opaque.

3. The thermostat of claim 1, wherein the housing is a single integral component.

4. The thermostat of claim 3, further comprising:
 a plurality of wire terminals positioned within the internal volume and each configured to secure one of a plurality of control wires from a heating, ventilation, and air conditioning system.

5. The thermostat of claim 4, further comprising:
 a mounting plate configured for attaching the housing to a mounting surface, wherein the mounting plate is positioned within the internal volume of the base and removably attached to the base, and wherein the mounting plate includes an aperture configured to allow the plurality controls wires to pass through the mounting plate into the internal volume of the base.

6. The thermostat of claim 5, wherein the ends of the top wall, the bottom wall, the first side, and the second side wall distal from the front wall define a planar rear face of the base; and
 wherein the mounting plate includes a rear surface that is flush with the rear face of the base when the mounting plate is attached to the base.

7. The thermostat of claim 1, further comprising:
 a front cover that covers at least a portion of the front wall and covers at least a portion of the bottom wall.

8. The thermostat of claim 7, further comprising:
 a sensor lens positioned in an aperture formed through the front cover and the base; and
 a sensor positioned within the internal volume of the base and aligned with the sensor lens.

9. The thermostat of claim 8, wherein the sensor is a proximity sensor.

10. The thermostat of claim 8, wherein the sensor is an occupancy sensor.

11. The thermostat of claim 1, further comprising:
 a top cover removably attached to the housing, wherein the top cover covers at least a portion of the top wall, covers at least a portion of the first side wall, and covers at least a portion of the second side wall.

12. The thermostat of claim 1, further comprising:
 a protective cover attached to the touch sensitive display so that the touch sensitive display is positioned between the protective cover and the display mount.

13. The thermostat of claim 1, wherein the display mount is located above the base.

14. The thermostat of claim 1, wherein the display mount is located below the base.

15. The thermostat of claim 1, wherein the display mount is located even with and to one side of the base.

16. A thermostat, comprising:
 a housing, comprising:
  a base defining an internal volume; and
  a display mount extending away from the base, the display mount including a mounting surface;
 a display configured to display visual media and receive user inputs, wherein the display is attached to the mounting surface of the display mount, and wherein the display does not overlap the base when viewed from the front of the thermostat; and
 processing electronics positioned within the interior volume of the base, wherein the processing electronics are configured to operate the display.

17. The thermostat of claim 16, wherein the display mount and the display are not opaque.

18. The thermostat of claim 16, wherein the housing is a single integral component.

19. The thermostat of claim 16, further comprising:
 a plurality of wire terminals positioned within the internal volume and each configured to secure one of a plurality of control wires from a heating, ventilation, and air conditioning system.

20. The thermostat of claim 19, further comprising:
 a mounting plate configured for attaching the housing to a mounting surface, wherein the mounting plate is positioned within the internal volume of the base and removably attached to the base, and wherein the mounting plate includes an aperture configured to allow the plurality controls wires to pass through the mounting plate into the internal volume of the base.

21. The thermostat of claim 16, further comprising:
 a sensor lens positioned in an aperture formed through the base; and
 a sensor positioned within the internal volume of the base and aligned with the sensor lens.

22. The thermostat of claim 21, wherein the sensor is a proximity sensor.

23. The thermostat of claim 21, wherein the sensor is an occupancy sensor.

24. The thermostat of claim 16, wherein the display mount is located above the base.

25. The thermostat of claim 16, wherein the display mount is located below the base.

26. The thermostat of claim 16, wherein the display mount is located even with and to one side of the base.

* * * * *